United States Patent
Hannon

(10) Patent No.: US 9,280,145 B2
(45) Date of Patent: *Mar. 8, 2016

(54) APPARATUS, SYSTEM, AND METHOD FOR DETECTING THE PRESENCE OF AN INTOXICATED DRIVER AND CONTROLLING THE OPERATION OF A VEHICLE

(71) Applicant: Driving Management Systems, Inc., San Francisco, CA (US)

(72) Inventor: Marwan Hannon, San Francisco, CA (US)

(73) Assignee: Driving Management Systems, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/195,350

(22) Filed: Mar. 3, 2014

(65) Prior Publication Data

US 2014/0180500 A1    Jun. 26, 2014

Related U.S. Application Data

(63) Continuation of application No. 13/195,691, filed on Aug. 1, 2011, now Pat. No. 8,686,864, which is a continuation-in-part of application No. 13/041,209, filed on Mar. 4, 2011, now Pat. No. 8,718,536.

(60) Provisional application No. 61/433,854, filed on Jan. 18, 2011.

(51) Int. Cl.
*G04B 23/00* (2006.01)
*G05B 11/00* (2006.01)
(Continued)

(52) U.S. Cl.
CPC ............... *G05B 11/00* (2013.01); *H04K 3/415* (2013.01); *H04L 67/12* (2013.01); *H04K 2203/16* (2013.01); *H04K 2203/22* (2013.01)

(58) Field of Classification Search
USPC ................... 455/576, 426.12, 426.24, 572.1; 180/271, 272, 287; 73/23.2, 23.3; 600/300

See application file for complete search history.

(56) References Cited

U.S. PATENT DOCUMENTS

| 5,258,968 A | 11/1993 | Matsuda et al. |
|---|---|---|
| 6,188,315 B1 | 2/2001 | Herbert et al. |

(Continued)

FOREIGN PATENT DOCUMENTS

| CN | 201347000 Y | 11/2009 |
|---|---|---|
| CN | 101808273 A | 8/2010 |

(Continued)

OTHER PUBLICATIONS

U.S. Appl. No. 13/041,209 Office Action and Interview Summary dated Jul. 1, 2013; 11 pages.

(Continued)

*Primary Examiner* — Dominic E Rego
(74) *Attorney, Agent, or Firm* — K&L Gates LLP

(57) ABSTRACT

In various embodiments, apparatus, systems, and methods for detecting an intoxicated driver of a vehicle and preventing operation of the vehicle are presented. In one embodiment, an apparatus comprises an air intake configured to intake an air sample from a predetermined detection zone. The predetermined detection zone is defined as a three-dimensional zone substantially in or in proximity of an area of a vehicle occupied by a driver. An operator detection sensor detects the presence of the driver within the predetermined detection zone. The operator detection sensor automatically operates the air intake when the operator is detected. A detector module comprises a sensor configured to produce an electrical signal representative of a blood alcohol content of the driver. A control module is electrically coupled to the detector module to control at least one operation of the vehicle in response to the signal received by the control module from the sensor.

20 Claims, 11 Drawing Sheets

(51) Int. Cl.
*H04K 3/00* (2006.01)
*H04L 29/08* (2006.01)

(56) References Cited

U.S. PATENT DOCUMENTS

| | | |
|---|---|---|
| 6,188,615 B1 | 2/2001 | Perner et al. |
| 6,556,810 B2 | 4/2003 | Suzuki |
| 6,620,108 B2 | 9/2003 | Duval et al. |
| 6,726,636 B2 | 4/2004 | Der Ghazarian et al. |
| 6,728,542 B2 | 4/2004 | Meda |
| 6,892,131 B2 | 5/2005 | Coffee et al. |
| 6,901,264 B2 | 5/2005 | Myr |
| 6,904,110 B2 | 6/2005 | Trans et al. |
| 6,967,581 B2 | 11/2005 | Karsten |
| 7,084,894 B2 | 8/2006 | Van Brocklin et al. |
| 7,086,596 B2 | 8/2006 | Meier et al. |
| 7,095,402 B2 | 8/2006 | Kunii et al. |
| 7,173,536 B2 | 2/2007 | Duval |
| 7,200,409 B1 | 4/2007 | Ichikawa et al. |
| 7,206,696 B2 | 4/2007 | Furukawa |
| 7,215,944 B2 | 5/2007 | Mecca |
| 7,218,236 B2 | 5/2007 | Mobley et al. |
| 7,254,417 B2 | 8/2007 | Slemmer et al. |
| 7,260,221 B1 | 8/2007 | Atsmon |
| 7,283,904 B2 | 10/2007 | Benjamin et al. |
| 7,287,617 B2 | 10/2007 | Mobley et al. |
| 7,292,936 B2 | 11/2007 | Furukawa |
| 7,299,890 B2 | 11/2007 | Mobley et al. |
| 7,319,455 B2 | 1/2008 | Kunii et al. |
| 7,377,352 B2 | 5/2008 | Mobley et al. |
| 7,379,083 B2 | 5/2008 | Van Brocklin et al. |
| 7,413,047 B2 | 8/2008 | Brown et al. |
| 7,426,689 B2 | 9/2008 | Simonds et al. |
| 7,464,005 B1 | 12/2008 | Beetner et al. |
| 7,481,292 B2 | 1/2009 | Mobley et al. |
| 7,505,784 B2 | 3/2009 | Barbera |
| 7,577,872 B2 | 8/2009 | DiBartolomeo et al. |
| 7,582,196 B2 | 9/2009 | Babes-Dornea et al. |
| 7,660,667 B2 | 2/2010 | Furukawa |
| 7,690,572 B2 | 4/2010 | Meier et al. |
| 7,698,062 B1 | 4/2010 | McMullen et al. |
| 7,714,832 B2 | 5/2010 | Tong et al. |
| 7,728,755 B1 | 6/2010 | Jocic |
| 7,729,709 B1 | 6/2010 | Loeb et al. |
| 7,820,108 B2 | 10/2010 | Lampotang et al. |
| 7,841,224 B2 | 11/2010 | Son |
| 7,876,205 B2 | 1/2011 | Catten et al. |
| 7,887,089 B2 | 2/2011 | Breed et al. |
| 7,891,456 B2 | 2/2011 | Takahashi et al. |
| 7,925,243 B2 | 4/2011 | McGary |
| 7,934,577 B2 | 5/2011 | Walter et al. |
| 7,966,215 B1 | 6/2011 | Myers et al. |
| 7,976,092 B2 | 7/2011 | Meredith et al. |
| 7,991,654 B1 | 8/2011 | Sacks et al. |
| 7,991,655 B1 | 8/2011 | Sacks et al. |
| 7,991,656 B1 | 8/2011 | Sacks et al. |
| 7,996,023 B2 | 8/2011 | McGary et al. |
| 8,002,957 B2 | 8/2011 | Grincourt et al. |
| 8,014,945 B2 | 9/2011 | Cooper et al. |
| 8,016,196 B2 | 9/2011 | Meier et al. |
| 8,032,764 B2 | 10/2011 | Shankar et al. |
| 8,051,449 B2 | 11/2011 | Kunii et al. |
| 8,065,051 B2 | 11/2011 | Chopcinski et al. |
| 8,090,399 B2 | 1/2012 | Howarter et al. |
| 8,095,065 B2 | 1/2012 | Nagara et al. |
| 8,099,054 B2 | 1/2012 | Tabe |
| 8,134,481 B2 | 3/2012 | Ohki |
| 8,136,011 B2 | 3/2012 | Cho et al. |
| 8,140,358 B1 | 3/2012 | Ling et al. |
| 8,166,081 B2 | 4/2012 | Christensen et al. |
| 8,179,271 B2 | 5/2012 | Kamiki |
| 8,196,694 B2 | 6/2012 | Biondo et al. |
| 8,201,437 B2 | 6/2012 | Takata |
| 8,213,914 B2 | 7/2012 | Kim et al. |
| 8,213,962 B2 | 7/2012 | Carr |
| 8,233,775 B2 | 7/2012 | Kunii et al. |
| 8,238,951 B2 | 8/2012 | McGary |
| 8,239,831 B2 | 8/2012 | Brennan et al. |
| 8,240,419 B2 | 8/2012 | Zimmermann et al. |
| 8,249,627 B2 | 8/2012 | Olincy et al. |
| 8,258,919 B2 | 9/2012 | Corradino et al. |
| 8,258,968 B2 | 9/2012 | Ghazarian et al. |
| 8,265,590 B2 | 9/2012 | Sennett et al. |
| 8,270,933 B2 | 9/2012 | Riemer et al. |
| 8,280,417 B2 | 10/2012 | Venkatachalam et al. |
| 8,290,509 B2 | 10/2012 | Jung et al. |
| 8,296,728 B1 | 10/2012 | Webster |
| 8,315,597 B2 | 11/2012 | Olincy et al. |
| 8,326,635 B2 | 12/2012 | Usher et al. |
| 8,340,730 B2 | 12/2012 | Pallotta |
| 8,346,310 B2 | 1/2013 | Boll et al. |
| 8,359,014 B2 | 1/2013 | Olincy et al. |
| 8,374,636 B2 | 2/2013 | McDonough |
| 8,377,705 B2 | 2/2013 | Lambert et al. |
| 8,401,578 B2 | 3/2013 | Inselberg |
| 8,401,589 B2 | 3/2013 | Liu et al. |
| 8,401,848 B2 | 3/2013 | Dowlatkhah |
| 8,412,123 B2 | 4/2013 | Foster |
| 8,413,217 B2 | 4/2013 | Bhatia |
| 8,417,268 B1 | 4/2013 | Halferty et al. |
| 8,442,447 B2 | 5/2013 | Veluppillai et al. |
| 8,479,864 B2 | 7/2013 | White et al. |
| 8,594,041 B2 | 11/2013 | Mecca |
| 8,706,143 B1 | 4/2014 | Elias |
| 8,718,536 B2 | 5/2014 | Hannon |
| 2001/0006886 A1 | 7/2001 | Suzuki |
| 2002/0084130 A1 | 7/2002 | Der Gharian et al. |
| 2002/0132646 A1 | 9/2002 | Girod |
| 2002/0156602 A1 | 10/2002 | Kunii et al. |
| 2002/0168981 A1 | 11/2002 | Meda |
| 2003/0073406 A1 | 4/2003 | Benjamin et al. |
| 2003/0086515 A1 | 5/2003 | Trans et al. |
| 2003/0120139 A1 | 6/2003 | Duval et al. |
| 2003/0222144 A1 | 12/2003 | Meier et al. |
| 2004/0083031 A1 | 4/2004 | Okezie |
| 2004/0124697 A1 | 7/2004 | MacGregor et al. |
| 2004/0239510 A1 | 12/2004 | Karsten |
| 2004/0267607 A1 | 12/2004 | Maddux |
| 2005/0050209 A1 | 3/2005 | Main, II |
| 2005/0186933 A1 | 8/2005 | Trans |
| 2005/0230175 A1 | 10/2005 | Brown et al. |
| 2005/0261824 A1 | 11/2005 | Furukawa |
| 2005/0261829 A1 | 11/2005 | Furukawa |
| 2006/0032742 A1 | 2/2006 | Babes-Dornea et al. |
| 2006/0033628 A1 | 2/2006 | Duval |
| 2006/0044144 A1 | 3/2006 | Duval |
| 2006/0058951 A1 | 3/2006 | Cooper et al. |
| 2006/0058952 A1 | 3/2006 | Cooper et al. |
| 2006/0058953 A1 | 3/2006 | Cooper et al. |
| 2006/0068829 A1 | 3/2006 | Mecca |
| 2006/0080031 A1 | 4/2006 | Cooper et al. |
| 2006/0080032 A1 | 4/2006 | Cooper et al. |
| 2006/0099940 A1 | 5/2006 | Pfleging et al. |
| 2006/0205394 A1 | 9/2006 | Vesterinen |
| 2006/0224945 A1 | 10/2006 | Khan et al. |
| 2006/0237252 A1 | 10/2006 | Mobley et al. |
| 2006/0237253 A1 | 10/2006 | Mobley et al. |
| 2006/0238362 A1 | 10/2006 | Mobley et al. |
| 2006/0239856 A1 | 10/2006 | Mobley et al. |
| 2006/0240860 A1 | 10/2006 | Benco et al. |
| 2006/0265508 A1 | 11/2006 | Angel et al. |
| 2007/0032225 A1 | 2/2007 | Konicek et al. |
| 2007/0072553 A1 | 3/2007 | Barbera |
| 2007/0088495 A1 | 4/2007 | Ibrahim |
| 2007/0130153 A1 | 6/2007 | Nachman et al. |
| 2007/0136068 A1 | 6/2007 | Horvitz |
| 2007/0147353 A1 | 6/2007 | Mecca |
| 2007/0182595 A1 | 8/2007 | Ghasabian |
| 2007/0188472 A1 | 8/2007 | Ghassabian |
| 2007/0193811 A1 | 8/2007 | Breed et al. |
| 2007/0196078 A1 | 8/2007 | Kunii et al. |
| 2007/0288164 A1 | 12/2007 | Gordon et al. |
| 2008/0009296 A1 | 1/2008 | Han |
| 2008/0123580 A1 | 5/2008 | Vathulya |

(56) References Cited

U.S. PATENT DOCUMENTS

| | | |
|---|---|---|
| 2008/0147314 A1 | 6/2008 | Cubillo |
| 2008/0168398 A1 | 7/2008 | Geelen et al. |
| 2008/0182598 A1 | 7/2008 | Bowman |
| 2008/0208447 A1 | 8/2008 | Geelen et al. |
| 2009/0006024 A1 | 1/2009 | Seguin |
| 2009/0012704 A1 | 1/2009 | Franco et al. |
| 2009/0024707 A1 | 1/2009 | Aase et al. |
| 2009/0028179 A1 | 1/2009 | Albal |
| 2009/0075139 A1 | 3/2009 | Kucernak et al. |
| 2009/0083035 A1 | 3/2009 | Huang et al. |
| 2009/0085728 A1 | 4/2009 | Catten et al. |
| 2009/0089293 A1 | 4/2009 | Garritano et al. |
| 2009/0090577 A1 | 4/2009 | Takahashi et al. |
| 2009/0112572 A1 | 4/2009 | Thorn |
| 2009/0146848 A1 | 6/2009 | Ghassabian |
| 2009/0166197 A1 | 7/2009 | Grincourt et al. |
| 2009/0177736 A1 | 7/2009 | Christensen et al. |
| 2009/0201138 A1 | 8/2009 | Der Ghazarian et al. |
| 2009/0215466 A1 | 8/2009 | Ahl et al. |
| 2009/0238386 A1 | 9/2009 | Usher et al. |
| 2009/0253423 A1 | 10/2009 | Kullberg |
| 2009/0255917 A1 | 10/2009 | Feichko et al. |
| 2009/0264161 A1 | 10/2009 | Usher et al. |
| 2009/0278698 A1 | 11/2009 | Kamiki |
| 2010/0004004 A1 | 1/2010 | Browne-Swinburne et al. |
| 2010/0009626 A1 | 1/2010 | Farley |
| 2010/0010740 A1 | 1/2010 | Nachman et al. |
| 2010/0035596 A1 | 2/2010 | Nachman et al. |
| 2010/0035632 A1 | 2/2010 | Catten |
| 2010/0043524 A1 | 2/2010 | Takata |
| 2010/0062788 A1 | 3/2010 | Nagorniak |
| 2010/0082820 A1 | 4/2010 | Furukawa |
| 2010/0113073 A1 | 5/2010 | Schlesener et al. |
| 2010/0131304 A1 | 5/2010 | Collopy et al. |
| 2010/0164836 A1 | 7/2010 | Liberatore |
| 2010/0167716 A1 | 7/2010 | Howarter et al. |
| 2010/0188232 A1 | 7/2010 | Lambert et al. |
| 2010/0199176 A1 | 8/2010 | Chronqvist |
| 2010/0236924 A1 | 9/2010 | Chapples et al. |
| 2010/0251804 A1 | 10/2010 | Morley et al. |
| 2010/0269566 A1 | 10/2010 | Carroll et al. |
| 2010/0294583 A1 | 11/2010 | Biondo et al. |
| 2010/0297929 A1 | 11/2010 | Harris |
| 2010/0306309 A1 | 12/2010 | Santori et al. |
| 2010/0311345 A1 | 12/2010 | Santori et al. |
| 2010/0314190 A1 | 12/2010 | Zimmermann et al. |
| 2010/0322293 A1 | 12/2010 | Rhodes et al. |
| 2010/0331051 A1 | 12/2010 | Kim et al. |
| 2010/0332226 A1 | 12/2010 | Lee et al. |
| 2011/0015934 A1 | 1/2011 | Rowe et al. |
| 2011/0018316 A1 | 1/2011 | Meredith et al. |
| 2011/0021213 A1 | 1/2011 | Carr |
| 2011/0021234 A1 | 1/2011 | Tibbitts et al. |
| 2011/0029869 A1 | 2/2011 | McLennan |
| 2011/0032096 A1 | 2/2011 | Miller et al. |
| 2011/0045813 A1 | 2/2011 | Choi |
| 2011/0045839 A1 | 2/2011 | Chao |
| 2011/0063098 A1 | 3/2011 | Fischer et al. |
| 2011/0065375 A1 | 3/2011 | Bradley |
| 2011/0079073 A1 | 4/2011 | Keays |
| 2011/0084807 A1 | 4/2011 | Logan et al. |
| 2011/0086668 A1 | 4/2011 | Patel |
| 2011/0093474 A1 | 4/2011 | Etchegoyen |
| 2011/0102160 A1 | 5/2011 | Heubel et al. |
| 2011/0105084 A1 | 5/2011 | Chandrasekaran |
| 2011/0111724 A1 | 5/2011 | Baptiste |
| 2011/0133919 A1 | 6/2011 | Evarts et al. |
| 2011/0143786 A1 | 6/2011 | Fan et al. |
| 2011/0153742 A1 | 6/2011 | Sloop et al. |
| 2011/0175930 A1 | 7/2011 | Hwang et al. |
| 2011/0183601 A1 | 7/2011 | Hannon |
| 2011/0187646 A1 | 8/2011 | Mahmoud |
| 2011/0207441 A1 | 8/2011 | Wood |
| 2011/0212737 A1 | 9/2011 | Isidore |
| 2011/0219080 A1 | 9/2011 | McWithey et al. |
| 2011/0230165 A1 | 9/2011 | Kleve et al. |
| 2011/0263293 A1 | 10/2011 | Blake et al. |
| 2011/0288764 A1 | 11/2011 | Sathish et al. |
| 2011/0304446 A1 | 12/2011 | Basson et al. |
| 2011/0304465 A1 | 12/2011 | Boult et al. |
| 2011/0306304 A1 | 12/2011 | Forutanpour et al. |
| 2012/0032876 A1 | 2/2012 | Tabe |
| 2012/0034954 A1 | 2/2012 | Tabe |
| 2012/0035923 A1 | 2/2012 | Krause |
| 2012/0052854 A1 | 3/2012 | DiMeo et al. |
| 2012/0055726 A1 | 3/2012 | Hannon |
| 2012/0064924 A1 | 3/2012 | Schapsis et al. |
| 2012/0066638 A1 | 3/2012 | Ohri |
| 2012/0109451 A1 | 5/2012 | Tan |
| 2012/0110126 A1 | 5/2012 | Sparks |
| 2012/0119936 A1 | 5/2012 | Miller et al. |
| 2012/0122525 A1 | 5/2012 | Miller et al. |
| 2012/0136503 A1 | 5/2012 | Schunder |
| 2012/0136529 A1 | 5/2012 | Curtis et al. |
| 2012/0140147 A1 | 6/2012 | Satoh et al. |
| 2012/0157069 A1 | 6/2012 | Elliott et al. |
| 2012/0176237 A1 | 7/2012 | Tabe |
| 2012/0228047 A1 | 9/2012 | White et al. |
| 2012/0236136 A1 | 9/2012 | Boddy |
| 2012/0244883 A1 | 9/2012 | Tibbitts et al. |
| 2012/0265535 A1 | 10/2012 | Bryant-Rich et al. |
| 2012/0283894 A1 | 11/2012 | Naboulsi |
| 2012/0284659 A1 | 11/2012 | De Leon |
| 2013/0046562 A1 | 2/2013 | Taylor et al. |
| 2013/0084847 A1 | 4/2013 | Tibbitts et al. |
| 2014/0179351 A1 | 6/2014 | Hannon |

FOREIGN PATENT DOCUMENTS

| | | |
|---|---|---|
| CN | 201792751 U | 4/2011 |
| GB | 1401318 | 7/1975 |
| JP | H11-112413 A | 4/1999 |
| JP | 2000-230900 A | 8/2000 |
| JP | 2002-335584 A | 4/2002 |
| JP | 2004-249847 A | 9/2004 |
| JP | 2007-106277 A | 4/2007 |
| JP | 4034813 B2 | 1/2008 |
| JP | 2008-137624 | 6/2008 |
| JP | 2008-137624 A | 6/2008 |
| JP | 2008-160715 A | 7/2008 |
| JP | 2000-230900 A | 8/2008 |
| JP | 2009-035062 | 2/2009 |
| JP | 4351286 | 10/2009 |
| JP | 4351286 B2 | 10/2009 |
| KR | 10-2000-0001005 A | 1/2000 |
| KR | 2000-0001005 | 1/2000 |
| WO | WO 01/08328 A1 | 2/2001 |
| WO | WO 02/12883 A1 | 2/2002 |
| WO | WO 2004/018249 A1 | 3/2004 |
| WO | WO 2009/014703 A1 | 1/2009 |

OTHER PUBLICATIONS

U.S. Appl. No. 13/041,209 Amendment dated Oct. 1, 2013; 90 pages.

U.S. Appl. No. 13/041,209 Notice of Allowance and Interview Summary dated Dec. 27, 2013; 11 pages.

U.S. Appl. No. 13/195,691 Office Action May 29, 2013; 13 pages.

U.S. Appl. No. 13/195,691 Amendment dated Aug. 29, 2013; 12 pages.

U.S. Appl. No. 13/195,691 Notice of Allowance dated Nov. 14, 2013; 9 pages.

PCT/US2012/048785 International Search Report, Nov. 21, 2012, 3 pages.

PCT/US2012/048785 Written Opinion of the International Searching Authority, Nov. 21, 2012; 5 pages.

AU 2012246698 Examination Report dated Apr. 1 2014.

AU 2012290254 Examination Report dated Mar. 26, 2014.

PCT/US2012/048785, International Preliminary Report on Patentability dated Feb. 4, 2014 and Written Opinion Nov. 21, 2012; 6 pages.

(56) References Cited

OTHER PUBLICATIONS

PCTUS12021256 WO2012/145049, Written Opinion, Apr. 7, 2012; 8 pages.
PCTUS12021256 International Search Report, Apr. 7, 2012; 6 pages.
PCTUS12021256 International Preliminary Report on Patentability, Jul. 23, 2013; and Written Opinion, Apr. 7, 2012; 9 pages.
AlcoMater Premium AL7000 Breathalyzer Product Specifications, http://alcomate.net/index.php/model-al7000.html, Jun. 16, 2011.
Breathalyzer—Wikipedia, the free encyclopedia, http://en.wikipedia.org/wiki/Breathalyzer, Jun. 16, 2011.
How Stuff Works: How Breathalyzers Work, Jun. 16, 2011.
International Search Report for International Application No. PCT/US2012/021256 mailed Jul. 4, 2012, 6 pages.
Written Opinion of the International Searching Authority for International Application No. PCT/US2012/021256 mailed Jul. 4, 2012, 9 pages.
U.S. Appl. No. 14/195,276, filed Mar. 3, 2014.
U.S. Appl. No. 14/195,287, filed Mar. 3, 2014.

APPARATUS, SYSTEM, AND METHOD FOR DETECTING THE PRESENCE OF AN INTOXICATED DRIVER AND CONTROLLING THE OPERATION OF A VEHICLE

CROSS REFERENCE TO RELATED APPLICATION

This application is a continuation of co-pending U.S. patent application Ser. No. 13/195,691, filed on Aug. 1, 2011, entitled "APPARATUS, SYSTEM, AND METHOD FOR DETECTING THE PRESENCE OF AN INTOXICATED DRIVER AND CONTROLLING THE OPERATION OF A VEHICLE," which is a continuation-in-part of U.S. patent application Ser. No. 13/041,209, filed on Mar. 4, 2011, entitled "APPARATUS, SYSTEM, AND METHOD FOR DETECTING THE PRESENCE AND CONTROLLING THE OPERATION OF MOBILE DEVICES WITHIN A VEHICLE," and which claimed the benefit of U.S. Provisional Pat. Appl. No. 61/433,854, filed Jan. 18, 2011, entitled "APPARATUS, SYSTEM, AND METHOD FOR DETECTING THE PRESENCE AND CONTROLLING THE OPERATION OF MOBILE DEVICES WITHIN A VEHICLE," each of which is hereby incorporated by reference in their entireties.

BACKGROUND

Drunk driving continues to be an issue for modern society. One approach to combating drunk driving has been the installation of breathalyzer devices in vehicles of repeat drunk driver offenders. These devices require that a driver blow into a blow tube prior to operation of the vehicle. When blood alcohol content (BAC) over a predetermined legal limit is detected, the violation is logged and, in some cases, vehicle operation is prevented.

These devices currently have several drawbacks however. Because the devices utilize a blow tube, intoxicated drivers can simply have a sober friend blow into the blow tube, and thus circumvent the detection system. Additionally, these systems are typically only installed in vehicles after a driver has been convicted of drunk driving, and therefore do not prevent first-time offenders from operating a vehicle while intoxicated. Finally, because a blow tube is used, it is possible for a person to circumvent the system, such as using pressurized air or charcoal filters placed in the mouth.

It would be highly desirable to detect the presence of alcohol or an intoxicated driver, and disable a vehicle, without the need for a blow tube or obvious testing. It would also be desirable to have a system that can be installed in all new vehicles. In addition, it would be desirable to extend these systems to other vehicles such as planes and boats.

SUMMARY

An apparatus, system, and method for preventing operation of a vehicle by an intoxicated driver are disclosed.

In one embodiment, an apparatus for preventing vehicle operation based on a driver's BAC comprises a detector module. The detector module includes a sensor which is configured to measure alcohol content of the air within a predetermined vehicle zone. The detector module is calibrated to produce an electrical signal representative of the blood alcohol content of a driver based on the measurement of alcohol content in the air of the predetermine vehicle zone. A control module is electrically coupled to the detector module and is configured to control at least one vehicle operation based on the electrical signal from the sensor.

In various embodiments, the sensor may comprise a fuel cell alcohol sensor, an oxide semiconductor alcohol sensor, or an infrared alcohol sensor, among other sensors.

In one embodiment, the apparatus further comprises a vehicle status detector module which generates a signal representative of the current vehicle operation. The signal can correspond to whether the vehicle is stationary or moving. Based on the status of the vehicle as indicated by the vehicle status detector module, the control module can selectively activate or disable certain vehicle operations. In one embodiment, the control module can activate a vehicle horn, a vehicle light system, and an audible warning, for example. In another embodiment, the control module can disable the ignition system, the fuel system, or the transmission system, for example.

In one embodiment, a detection module may be located within a mobile device. The mobile device is configured to generate a wireless signal representative of the blood alcohol content of a user by measuring the alcohol content of the air in a predetermined vehicle zone. A control module is located within a vehicle, and is configured to receive a wireless signal from the mobile device. The control module is configured to control at least one vehicle operation based on the wireless signal from the mobile device.

A method is disclosed for controlling vehicle operation based on BAC of a driver. In one embodiment, the method includes measuring the BAC of a driver by measuring the alcohol content in the air of a predetermined vehicle zone. A signal is generated indicating a BAC over a predetermined limit. In response to the signal, at least one vehicle operation is controlled.

FIGURES

DESCRIPTION

Figure 1:
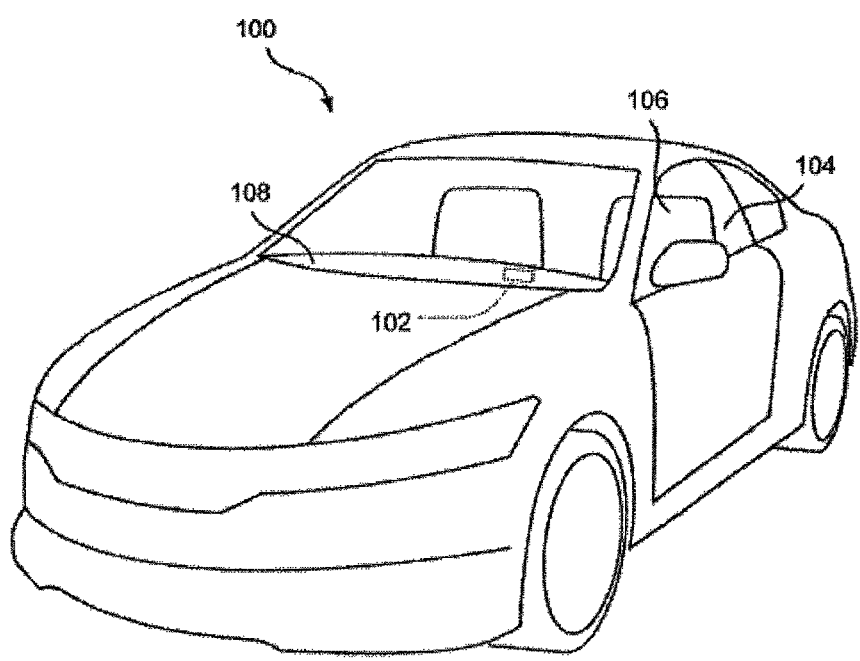
FIG. 1 illustrates a vehicle that includes a cabin for accommodating an individual in a driver seat.

The present disclosure describes embodiments of an apparatus, system, and method for detecting the presence of an intoxicated driver and controlling or disabling the operation of a vehicle when an intoxicated driver is detected. In particular, the present disclosure is directed to embodiments of an apparatus, system, and method for detecting the presence of an intoxicated driver in a predetermined location within a vehicle and disabling or activating some or all of the functions of the vehicle when an intoxicated driver is detected in the predetermined vehicle location. More particularly, the present disclosure is directed to automatically preventing an intoxicated person in the driver's seat of a vehicle from beginning or continuing operation of the vehicle.

It is to be understood that this disclosure is not limited to particular aspects or embodiments described, and as such may vary. It is also to be understood that the terminology used herein is for the purpose of describing particular aspects or embodiments only, and is not intended to be limiting, since the scope of the apparatus, system, and method for detecting the presence of an intoxicated driver within a vehicle and controlling the operation of the vehicle when an intoxicated driver is detected is defined only by the appended claims.

In one embodiment, the present disclosure provides an apparatus, system and method for detecting and restricting the use of a vehicle by an intoxicated driver, whether the vehicle is moving or stationary. An intoxicated driver is identified by a detector module comprising a sensor. The sensor samples the alcohol content of the air in a predetermined vehicle zone. When an air alcohol content corresponding to a predetermined blood alcohol content is detected, the sensor signals a control module which can control, disable, or modify operation of the vehicle based on the presence of an intoxicated driver.

In another embodiment, the present disclosure provides a system for detecting and restricting the use of a vehicle by an intoxicated driver by receiving a signal from a mobile device within a predetermined vehicle zone. Mobile devices, such as wireless devices, may include without limitation, for example, cellular telephones, smart phones, laptop computers, notebook computers, tablet devices (e.g., iPad by Apple®), Netbook®, among other wireless mobile devices that a user can interact with while located in a vehicle. In one embodiment, the presence of an intoxicated driver is detected by a mobile device in the driver's side area of the vehicle. The mobile device has a sensor that detects the BAC of the user. The location of the mobile device within the driver's zone is detected by at least one sensor located within the vehicle. When the presence of an intoxicated driver is detected through a sensor in a mobile device located within the driver zone, the operation of the vehicle is controlled, disabled, or modified with respect to the person located in the driver side area of the vehicle but not when an intoxicate person is located in other areas of the vehicle.

FIG. 1 illustrates a vehicle 100 that includes a cabin 104 for accommodating an individual in a driver seat 106. It will be appreciated in accordance with the present disclosure that the term vehicle is used broadly and is meant to include any kind of transportation vehicle. For example, the vehicle 100 may be any type of automobile, truck, sport utility vehicle, aircraft, watercraft, spacecraft, or any other means of transportation, or combinations thereof, where operation by an intoxicated operator can be detected and prevented.

Disposed on or within the dashboard 108 of the vehicle 100 is an alcohol detection and vehicle control system 102. In one embodiment, the alcohol detection and vehicle control system 102 is configured to detect the presence of an intoxicated person located in the driver seat 106 side of the vehicle 100 and control the operation of the vehicle by either disabling critical systems of the vehicle or by activating warning systems in the vehicle. In other embodiments, at least some elements or components of the alcohol detection and vehicle control system 102 may be located in other areas of the vehicle 100.

It may be desirable to place detection elements of the alcohol detection and vehicle control system 102 as close to the driver as possible. For example, sensors of the alcohol detection and vehicle control system 102 may be located in proximity of the driver seat 106. This configuration provides more precise detection of the presence of an intoxicated person in the driver seat 106 side of the vehicle 100 and prevents false detection of other intoxicated persons located within the vehicle 100 to allow sober persons to transport intoxicated persons within the vehicle. Other elements or components such as control logic may be located in other locations of the vehicle 100 away from the driver seat 106.

In one embodiment, the alcohol detection and vehicle control system 102 is configured to detect an intoxicated person located in or in proximity of a detection zone 104. In accordance with the described embodiments, the detection zone 104 is defined as a zone substantially in or in proximity of the driver seat 106 side of the vehicle 100. In other embodiments, however, the detection zone may be any predefined zone within the vehicle 100, without limitation. In one aspect, the detection portion of the alcohol detection and vehicle control system 102 may be calibrated to detect a predetermined amount of alcohol present in the air of the detection zone. Once the predetermined value is detected, the alcohol detection and vehicle control system 102 controls the operation of the vehicle in one or more ways. For example, in one embodiment, the alcohol detection and vehicle control system 102 transmits a control signal to disable a critical system of the vehicle such as a fuel system, transmission system, or ignition system so as to prevent initial operation of the vehicle. By disabling a critical system of the vehicle, operation of the vehicle by an intoxicated driver is prevented. In another embodiment, the alcohol detection and vehicle control system 102 can activate certain vehicle systems to signal to law enforcement officers and other drivers that the operator of the vehicle is intoxicated. For example, the alcohol detection and vehicle control system 102 may activate the vehicle's horn, flash the vehicle lights, or activate an audible warning that the driver of the vehicle is intoxicated.

Accordingly, the alcohol detection and vehicle control system 102 can either completely or substantially prevent operation of the vehicle or sufficiently interfere with operation of the vehicle so as to alert law enforcement and other drivers of the intoxicated driver. For example, when the alcohol detection and vehicle control system 102 activates the horn or flashes the vehicle lights, law enforcement will be able to identify vehicles with intoxicated drivers and address any issues related thereto. By way of another example, when the alcohol detection and vehicle control system 102 prevents the vehicle fuel system from being activated, the intoxicated person would be unable to start the vehicle 100, thereby preventing the intoxicated person from operating the vehicle. These and other embodiments are discussed in more detail hereinbelow.

Figure 2:
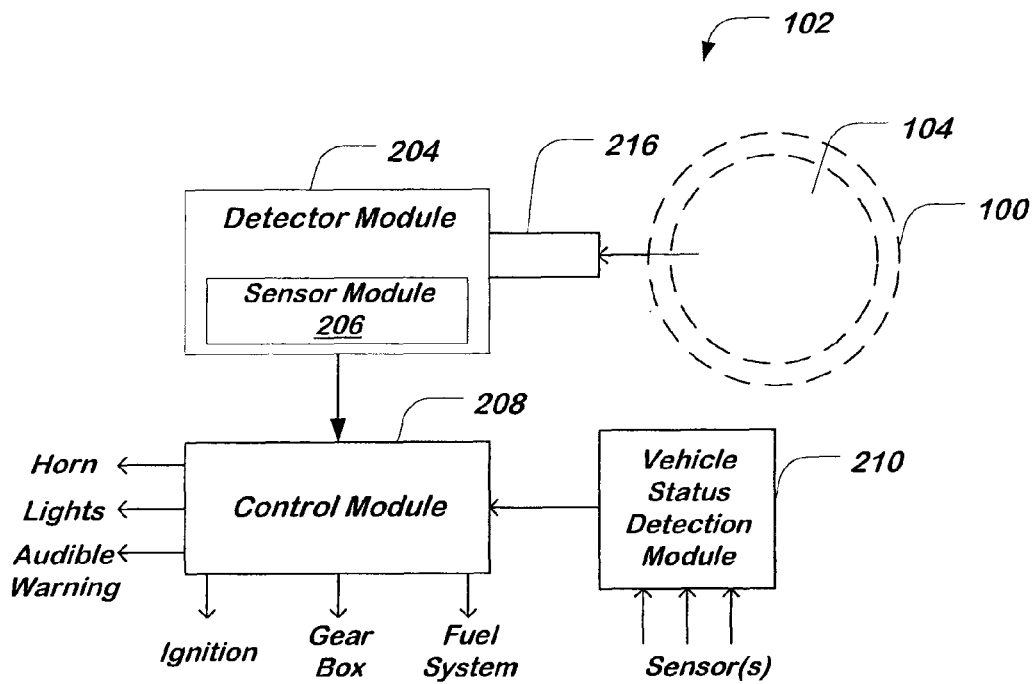
FIG. 2 illustrates one embodiment of an apparatus for detecting a BAC and controlling vehicle operation.

FIG. 2 illustrates one embodiment of the alcohol detection and vehicle control system 102. In one embodiment, the alcohol detection and vehicle control system 102 is configured to detect the presence of an intoxicated driver located in or in proximity of the driver seat 106 (FIG. 1) area of the vehicle 100. Once an intoxicated driver is detected, the alcohol detection and vehicle control system 102 is configured to control the operation of the vehicle 100. In one embodiment, the alcohol detection and vehicle control system 102 comprises a detector module 204 and a control module 208 electrically coupled to the detector module 204. The detector module 204 comprises a sensor module 206 to detect the presence of alcohol in the detection zone.

In one embodiment, the detector module 204 is configured to detect the presence of an intoxicated driver located within the detection zone 104 which is defined as a three-dimensional zone within or in proximity of the driver seat 106. In one aspect, the detector module 204 intakes an air sample from the detection zone 104 and determines the alcohol content of that air sample. In various embodiments, the detector module 204 may be configured to signal the control module 208 at varying levels of alcohol content that can be chosen based on the type of vehicle being operated.

In one embodiment, the detector module 204 may comprise a sensor module 206 and an air intake 216. The sensor module 206 may be configured to react to various levels of alcohol content in the air. In various embodiments, the sensor module 206 may comprise a fuel cell sensor, a semiconductor oxide sensor, or an infrared sensor, among others. It will be appreciated that the sensor module 206 can be calibrated for differing volumes of air located within the detection zone 104. For example, a sensor located within a standard sedan can be calibrated to react to a higher alcohol content in an air sample and a sensor located within a semi-tractor trailer cab can be calibrated to react to a lower alcohol content in an air sample. This difference in calibration can be varied to account for the differing volumes of air present in different vehicle detection zones 104.

The detector module 204 is electrically coupled to the control module 208. In one embodiment, the detector module 204 can be electrically coupled to the control module 208 by way of a direct wire connection. In another embodiment, the detector module 204 and the control module 208 may be electrically coupled by a wireless connection. In one embodiment, the detector module 204 and the control module 208 may be coupled to the electrical system of the vehicle 100 and powered by the vehicle battery, or may be powered by a separate battery.

In one embodiment, the control module 208 may be configured to control various vehicle operations and/or vehicle systems. The control module 208 may be configured to disable various critical vehicle systems. These critical vehicle systems may include the ignition system, the transmission system (or gear box), or the fuel system. By disabling various critical vehicle systems, the control module 208 may prevent activation and operation of the vehicle when the detector module 204 detects an intoxicated driver. In another embodiment, the control module 208 may be configured to activate various vehicle systems. These systems may include the vehicle horn, the vehicle lights, or an audible warning system installed in the vehicle 100.

In one embodiment, the alcohol detection and vehicle control system 102 comprises a vehicle status detection module 210. The vehicle status detection module 210 can be configured to detect the current status of the vehicle including whether the vehicle is currently moving or stationary. In addition, the vehicle status detection module 210 may be configured to determine whether or not the vehicle is currently running. In one embodiment, the vehicle status detection module 210 may provide a status signal to the control module 208. The control module 208 can then use the status signal to determine what vehicle operations should be activated or disabled. For example, when the status signal is representative of a stationary vehicle, the control module 208 can disable the vehicle fuel system, transmission system, or ignition system. As another example, when the status signal is representative of a moving vehicle, the control module 208 can activate the vehicle horn, flash the vehicle lights, or activate an audible warning to the driver and those around the driver that the driver is intoxicated. In one embodiment, the vehicle status detection module 210 may be formed integrally with the control module 208. In another embodiment, the vehicle status detection module 210 may be separate from the control module 208.

Figure 3:
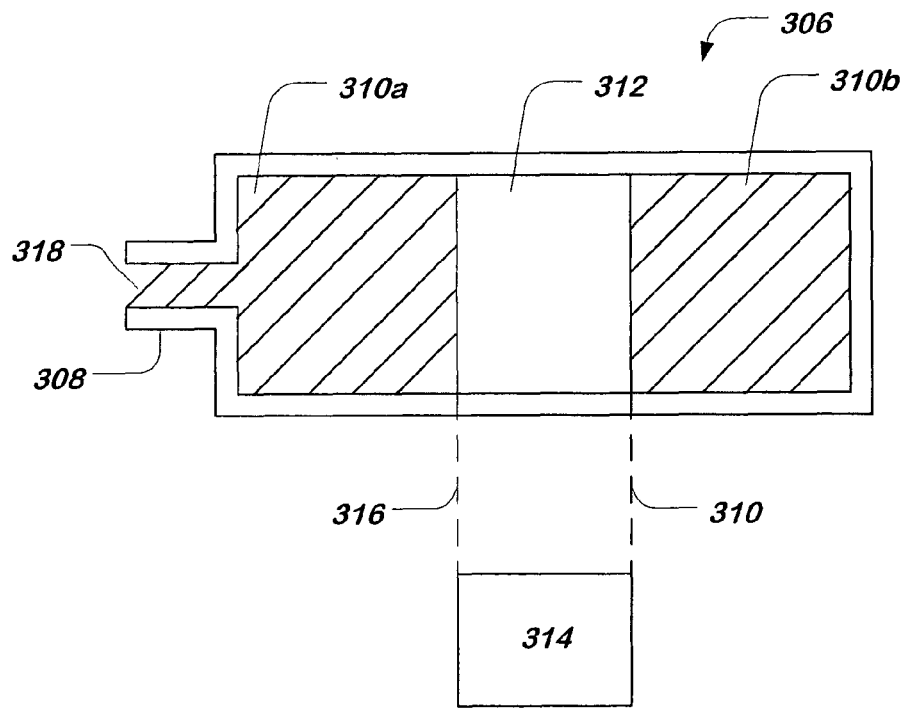
FIG. 3 illustrates one embodiment of a fuel cell alcohol sensor.

FIG. 3 is one embodiment of the sensor module 206 (FIG. 2) comprising a fuel cell sensor 306 for detecting the presence of alcohol in an air sample. The fuel cell sensor 306 may comprise a housing 308, electrodes 310a, 310b and an acid-electrolyte material 312 sandwiched between the electrodes 310a, 310b. The electrodes 310a, 310b may be made of any suitable material to allow for a current to be generated by the acid-electrolyte material 312. In one embodiment, the electrodes 310a, 310b are platinum electrodes or may comprise platinum. The acid-electrolyte material 312 may be any material compatible with the material of the electrodes 310a, 310b and capable of providing the proper reaction to the electrodes 310a, 310b. In one embodiment, the acid-electrolyte material 312 may be sulfuric acid. The fuel cell sensor 306 also comprises wires 316 which create an electrical path between the electrodes 310a, 310b. An electrical current meter 314 is connected in series with the electrodes 310a, 310b. In one embodiment, the current meter 314 is a processor, which may be formed integrally with the sensor module 206 (FIG. 2), or located within the detection module 204 (FIG. 2) or the control module 208 (FIG. 2).

In operation, the fuel cell sensor 306 intakes an air sample from the detection zone 104 through the opening 318. The air sample flows past the first electrode 310a, which causes the first electrode 310a to oxidize alcohol in the air sample and produce acetic acid, protons, and electrons. The electrons produced flow through the wire 316 from the first electrode 310a to the second electrode 310b producing a current along the wire 316 which can be measured by the current meter 314. The protons produced in the reaction move through the lower portion of the fuel cell sensor 306 and combine with oxygen and the electrons to produce water. The more alcohol that is oxidized by the first electrode 310a, the greater the electrical current generated in the wire 316. The current in the wire 316, as measured by current meter 314, corresponds to the alcohol content of the air sample, which can be calibrated to represent the blood alcohol content of a driver operating the vehicle 100.

Figure 4:
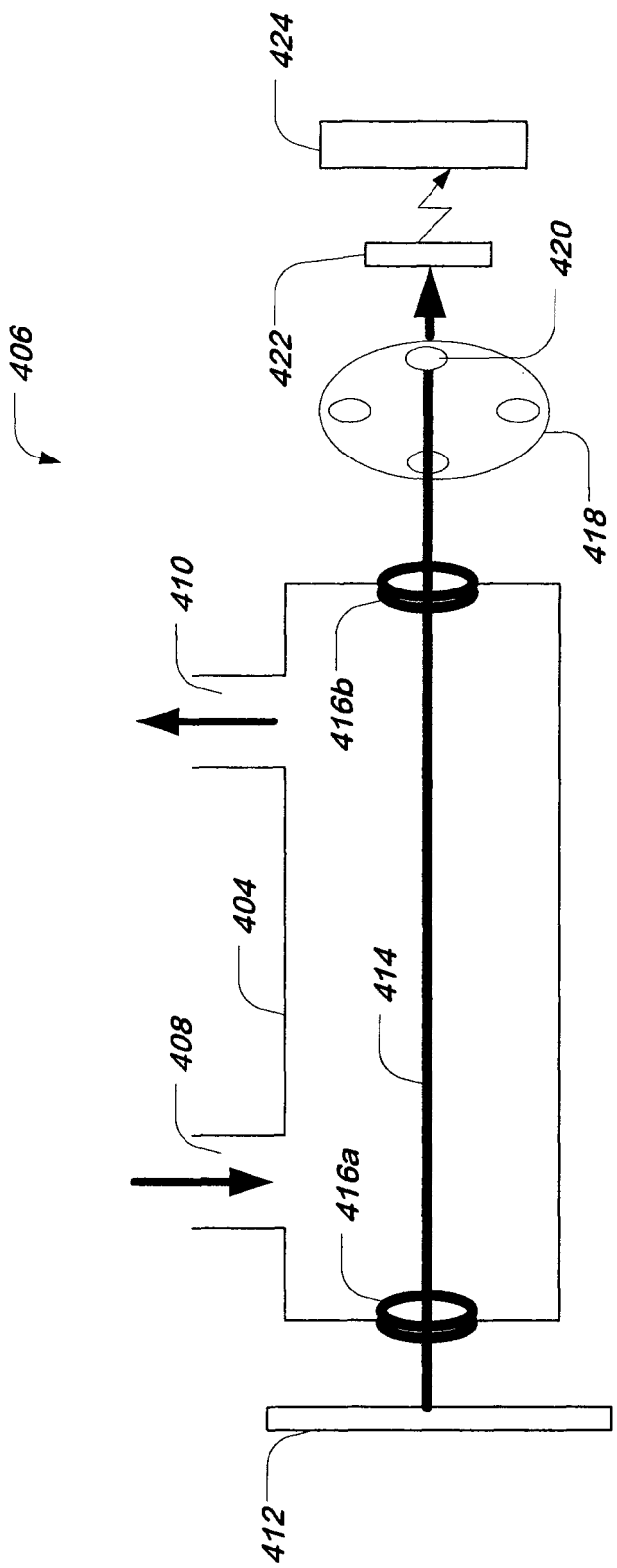
FIG. 4 illustrates one embodiment of an oxide semiconductor alcohol sensor.

FIG. 4 is one embodiment of the sensor module 206 (FIG. 2) comprising an infrared (IR) spectroscopy sensor 406 (IR sensor). The IR sensor 406 may comprise a housing 404. The housing 404 may comprise two openings, an intake opening 408 and an outflow opening 410. The housing 404 may comprise two lenses 416a, 416b aligned in a straight line through housing 404. The IR sensor 406 also comprises a lamp 412, a filter wheel 418, and a photocell 422.

In operation, the IR sensor 406 operates by measuring the absorption of IR light at a certain wavelength. The absorption wavelength corresponds to the chemical bonds found in ethanol (the type of alcohol found in alcoholic beverages and expelled by intoxicated persons). An air sample from the detection zone 104 enters the housing 404 through the intake opening 408. The lamp 412 generates an infrared beam 414 which travels through the first lens 416a and into the housing 404. The infrared beam 414 interacts with the air sample located in housing 404 allowing the alcohol in the air sample to absorb specific wavelengths of IR light. The infrared beam 414 then travels through the second lens 416b and into the filter wheel 418. The filter wheel 418 contains narrow band filters 420 which are configured to filter for the wavelengths absorbed by the bonds in ethanol. The infrared beam 414, after being filtered, then interacts with the photocell 422 which generates an electric pulse based on the amount of light interacting with the photocell 422. The amount of light that interacts with photocell 422 is related to the amount of alcohol present in the air sample. The electric pulse generated by the photocell 422 is then transmitted to a processor 424 which interprets the electric pulses and calculates the alcohol content of the air sample based on the absorption of infrared light. The processor 424 may be formed integrally with the sensor module 206 (FIG. 2), or may be located within the detection module 204 or the control module 208.

Figure 5:
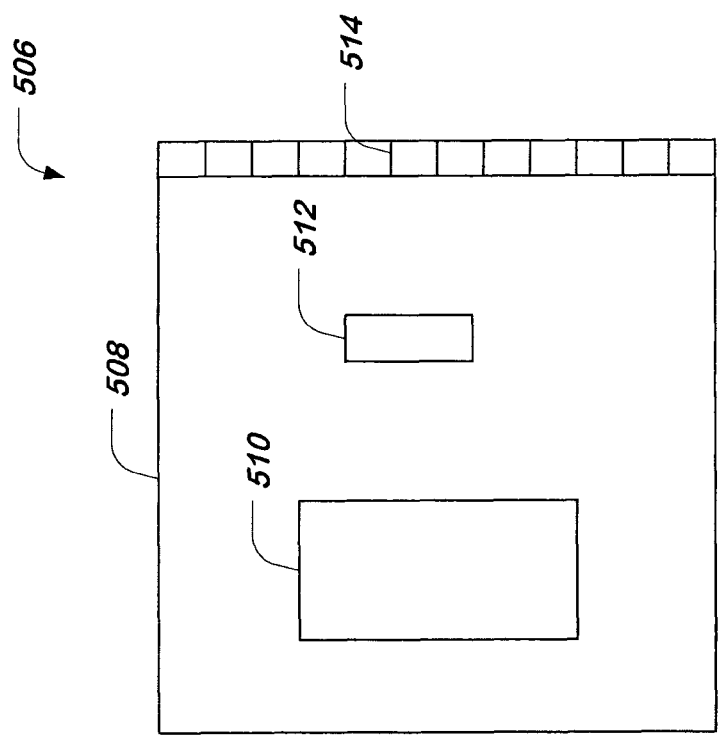
FIG. 5 illustrates one embodiment of an infrared alcohol sensor.

FIG. 5 is one embodiment of the sensor module 206 (FIG. 2) comprising a semiconductor-oxide sensor 506. The semiconductor-oxide sensor 506 comprises a printed circuit board 508 (PCB). The PCB 508 includes a heating element 510 and a breath alcohol sensor 512. The PCB 508 interfaces with a microprocessor or other circuit elements through the interface port 514. The heating element 510 is operable to warm up the breath alcohol sensor 512 to a predetermined temperature. The breath alcohol sensor 512 reacts to the presence of alcohol in an air sample passed over the PCB 508. The presence of alcohol will change one or more circuit characteristics (e.g., capacitance, resistance, etc.), which can be measured and converted into an alcohol content of the air sample. In various embodiments, the PCB 508 may also include a non-volatile memory unit (not shown) to store calibration and conversion data. The changing circuit characteristics can be monitored by a processor located in the detection module 204 (FIG. 2) or the control module 208 (FIG. 2), which interfaces with semiconductor-oxide sensor 506 through the interface port 514. In other embodiments, the processor may be formed integrally with the PCB 508.

Figure 6:
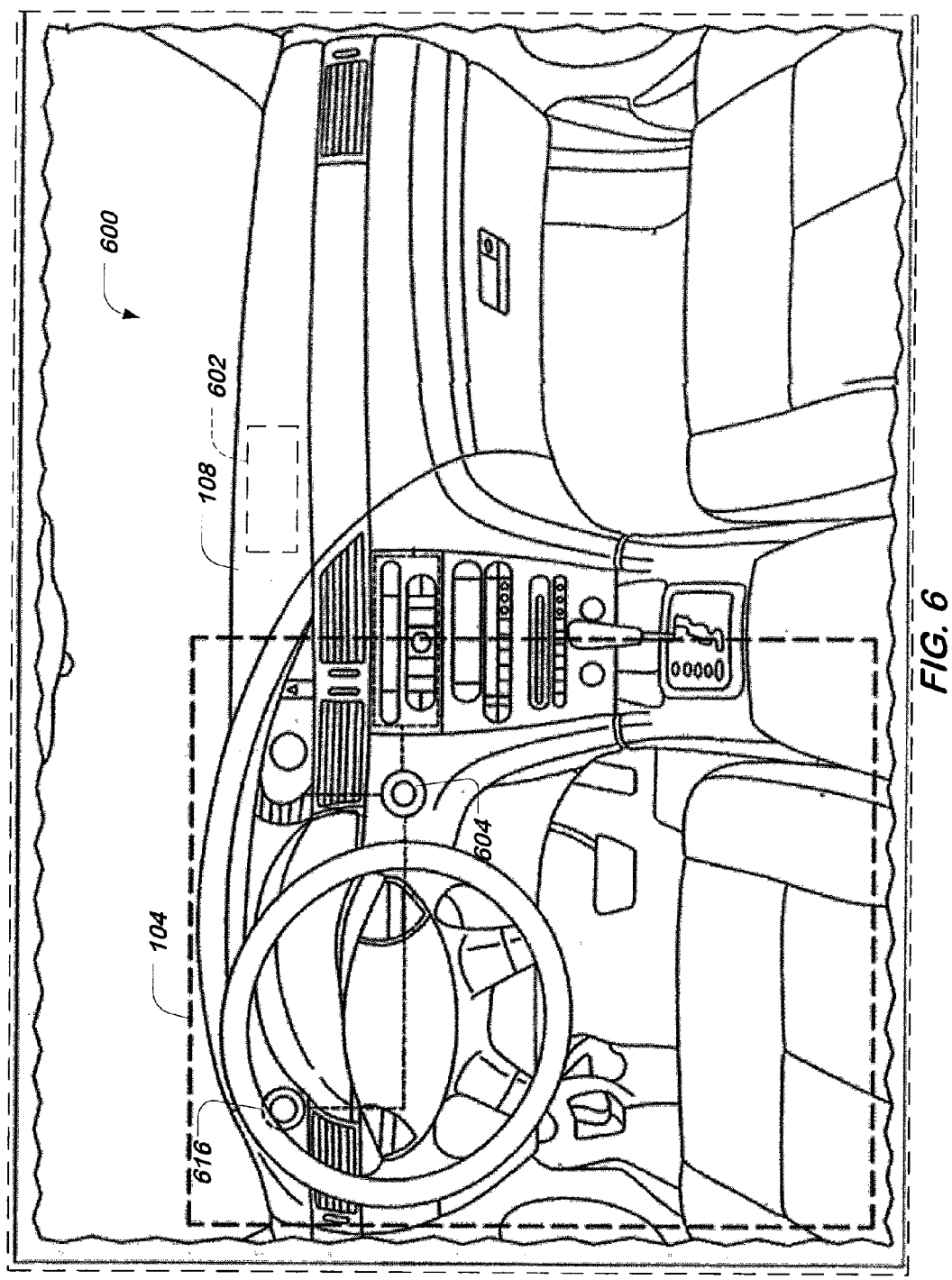
FIG. 6 illustrates an interior portion of the vehicle comprising one embodiment of the alcohol detection and control system located in the dashboard of the vehicle.

FIG. 6 illustrates an interior portion 600 of vehicle 100 comprising one embodiment of the alcohol detection and vehicle control system 102 located within the dashboard 108 of the vehicle 100. FIG. 6 illustrates possible locations within the dashboard 108 where the intake 616 for the detection module 204 may be located. It will be appreciated that the intake 616 can be located in or more of these locations on or within the dashboard 108. It would be preferable that the intake 616 and the detector module 204 be located within the dashboard 108 to prevent tampering. In addition, the control module 208 (FIG. 2) and the vehicle status detection module 210 (FIG. 2) may be located in the dashboard 108. In the embodiment shown in FIG. 6, the control module 208 and the vehicle status detection module 210 are shown as a single integral unit 602 and shown in phantom to indicate the integral unit 602 is located within the dashboard 108 to prevent tampering. It will be appreciated that the control module 208 and the vehicle status detection module 210 may be located in various places within the vehicle 100, including without limitation, the passenger cabin, under the hood, or formed integrally with the vehicle computer system. In one embodiment, the control module 208 may be configured with a data collection process to record a situation when the alcohol detection and vehicle control system 102 was deactivated by an owner of the vehicle 100 with or without the help of a car mechanic. Such tamper recording and detection features may be helpful in post accident investigations to determine in the alcohol detection and vehicle control system 102 was disabled and thus would void insurance coverage, for example.

With reference now to FIGS. 1-6, the alcohol detection and vehicle control system 102 comprises a detector module 204 and a control module 208 coupled to the detector module 204. The detector module detects the presence of alcohol within the detection zone 104, which corresponds to a blood alcohol content of a driver within the detection zone 104. When the detector module 204 detects the presence of alcohol within the detection zone 104, the control module activates, disables (prevents or substantially prevents the operation of) certain vehicle systems. The control module 208 can disable critical vehicle systems such as a fuel system, transmission system, or ignition system to prevent operation of the vehicle 100 by an intoxicated driver. The control module 208 can also activate vehicle systems such as a horn, vehicle lights, or an audible warning to indicate the presence of an intoxicated driver to law enforcement and other drivers. The detection module 204 is calibrated so that only an intoxicated driver is detected but allows normal operation when an intoxicated passenger is located outside of the detection zone 104.

In one embodiment, the alcohol detection and vehicle control system 102 may be triggered when the driver enters the vehicle 100. Upon being triggered, the alcohol detection and vehicle control system 102 is initialized and goes into detection mode to detect the presence of an intoxicated driver prior to operation of the vehicle. The detection mode is a process wherein the alcohol detection and vehicle control system 102, through at least one sensor and logic detects the presence of alcohol in the detection zone 104. In one embodiment, the detection process is initiated by the alcohol detection and vehicle control system 102, which is not dependent upon the driver's interaction to initiate the detection process. Decoupling the process from the driver is advantageous because it avoids reliance on self policing, which currently has failed as a preventative mechanism for drunk driving. Thus, the triggering condition may be the activation of a switch such as a pressure switch (not shown) located in the driver seat 106 to detect an occupant in the detection zone 104 or insertion of a key into the ignition of the vehicle 100, among other sensors.

Accordingly, upon activation of the pressure switch located in the driver seat 106, the alcohol detection and vehicle control system 102 would initiate a detection process via logic that controls the operation of the detection module 204 and the control module 208. In accordance with the detection process, logic would instruct the detector module 204 to begin acquiring air samples through the intake 216 from the detection zone 104 located within the driver side area 104 of the vehicle 102. The detection module would then activate the sensor module 206 to begin sensing the alcohol content of the air sample. In one embodiment, the control module 208 may delay operation of the vehicle for a predetermined amount of time to allow the air within the detection zone to become properly saturated by the driver to ensure a proper blood alcohol reading based on sampling the air within the detection zone 104. In one embodiment, the detection module 204 may be located within the dashboard 108 console. This configuration would hide the detection module 204 to prevent drivers from tampering with the alcohol detection and vehicle control system 102 by blocking the detection module or preventing activation of the detection process. In one embodiment, the detection module 204 may be coupled to the ignition to render the vehicle 100 inoperable when the intake 216 of the detection module 204 is blocked.

The logic provides a detection process for detecting the presence of an intoxicated driver within the detection zone 104 to prevent operation of the vehicle 100 by an intoxicated person. The detection process will not, however, detect the presence of intoxicated passengers, and therefore will not interfere with the operation of the vehicle 100 by a sober driver transporting intoxicated passengers.

In one embodiment, the alcohol detection and vehicle control system 102 includes a vehicle status detection module 210 configured to determine a current condition state of the vehicle. In various embodiments, the condition state may include whether the vehicle is moving or stationary. The condition state may also include, for example, information regarding whether the vehicle is currently running or whether the vehicle is currently in gear, among other condition states. In one embodiment, the vehicle status detection module 210 may be coupled to the control module 208. The control module 208 may use input from the vehicle status detection module 210 to determine which vehicle systems to activate or disable. In one embodiment, the control module 208 can disable critical vehicle systems when the vehicle status detection module 210 indicates that it is safe to do so, such as when the vehicle status detection module 210 indicates that the vehicle 100 is currently stopped.

When the vehicle status detection module 210 indicates that the vehicle 100 is not moving, the control module 208 may disable critical vehicle systems to prevent current or subsequent operation of the vehicle by an intoxicated driver. In one embodiment, the critical vehicle systems may include the fuel system, the transmission system, or the ignition system. By preventing activation of the ignition system, the control module 208 can prevent an intoxicated person from starting and therefore operating the vehicle 100. Disabling the transmission system or fuel system will also prevent an intoxicated person from operating the vehicle 100.

When a vehicle is already in motion when an intoxicated driver is detected, it may be more dangerous to disable operation of critical vehicle systems. Therefore, when the vehicle status detection module 210 indicates that the vehicle 100 is moving, the control module 208 may cause the activation of certain vehicle systems to alert law enforcement and other drivers of the presence of an intoxicated driver within the vehicle 100. In one embodiment, the vehicle systems that can be activated by the control module 208 include the vehicle horn, the vehicle lights, or an audible warning. In one embodiment, the vehicle lights may be operated by the control module so as to flash on and off to give a visual indication of an intoxicated driver. In another embodiment, an audible warning system may be installed in a vehicle with the alcohol detection and vehicle control system 102 that gives an audible warning in the form of a tone or prerecorded message that the driver of the vehicle 102 is intoxicated.

Figure 7A:
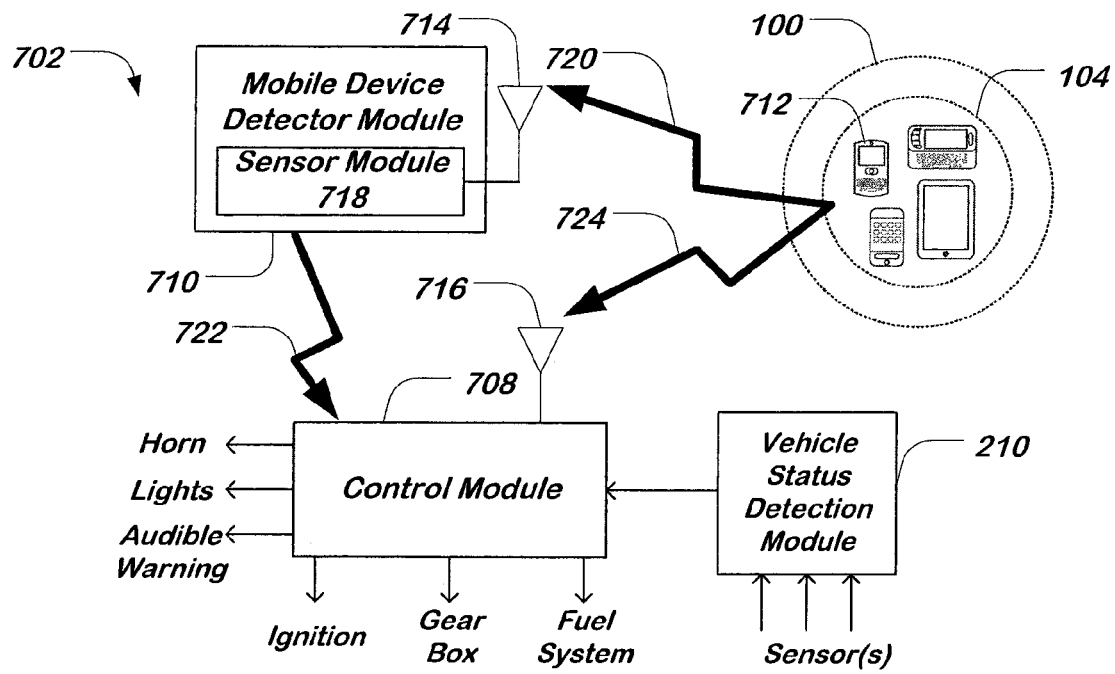
FIG. 7A illustrates one embodiment of an alcohol detection and vehicle control system utilizing a mobile device.
Figure 7B:
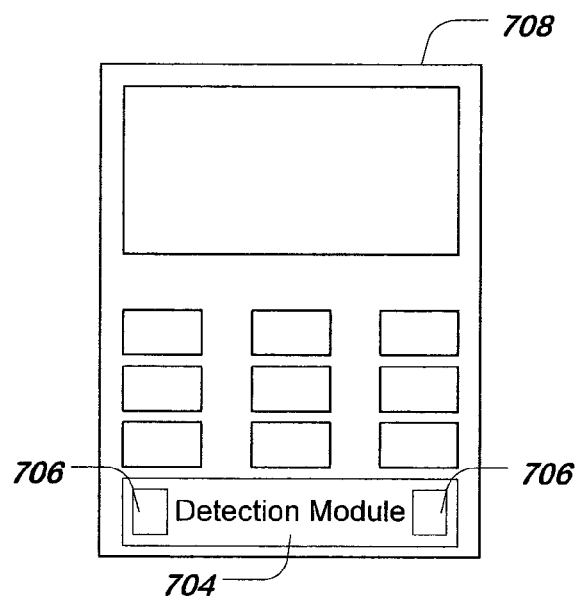
FIG. 7B illustrates one embodiment of a mobile device with a detection module formed integrally therein.

FIGS. 7A and 7B illustrate one embodiment of alcohol detection and vehicle control system 102 (FIGS. 1-2). In one embodiment, the alcohol detection and vehicle control system 102 comprises a mobile device 712, a mobile device detection module 710 and a control module 708. As shown in FIG. 7B, the mobile device 712 comprises one embodiment of the detection module 204 shown as the mobile alcohol detection module 704. The mobile alcohol detection module 704 includes at least one sensor 706. The control module 208 receives input from the mobile alcohol detection module 704 and from the mobile device detection module 710.

In one embodiment, the alcohol detection and vehicle control system 102 (FIGS. 1-2) operates by combining the signals from the mobile alcohol detection module 704 with input from the mobile device detection module 710. The mobile alcohol detection module 704 is located within a mobile device 712. When an intoxicated person uses the mobile device 712, the mobile alcohol detection module 704 intakes an air sample from the user of the device, and determines the alcohol content of the air sample using sensor 706. The mobile alcohol detection module 706 is calibrated such that the alcohol content of the air sample corresponds to the blood alcohol content of the person using the mobile device 712. The detection module 704 then transmits a value corresponding to the blood alcohol content of the user of the mobile device 712 to the control module 708 via a wireless signal. The wireless signal can be any suitable wireless protocol, such as, but not limited to, WiFi, Bluetooth, GSM, or CDMA.

In addition to the mobile alcohol detection module 704, the control module 708 receives input from the mobile device detection module 710. The mobile device detection module 704 is configured to detect the presence of a mobile device 712 within the detection zone 104. When a mobile device 712 is detected within the detection zone 104, the mobile device detection module 704 signals the control module 708. When the control module 708 receives a signal from the mobile device detection module 710 indicating a mobile device 712 located within the detection zone 104 and receives a signal from the mobile alcohol detection module 704 located within the mobile device 712, the control module 708 will control the operation of various vehicle systems to prevent or limit the operation of a vehicle by an intoxicated driver.

The mobile device detection module 710 comprises a multi-band antenna 714 to receive signal transmissions from the mobile device 712 and the control module 708 comprises an antenna 716 to receive signal transmissions from the mobile alcohol detection module 704. In various embodiments, the mobile device detector module 710 and the control module 708 may share an antenna when these components are located in proximity of each other.

In various embodiments, the mobile device 712 may be implemented as a handheld portable device, computer, mobile telephone, sometimes referred to as a smartphone, tablet personal computer (tablet PC), laptop computer, or any combination thereof. Examples of smartphones include, for example, Palm® products such as Palm® Treo® smartphones (now Hewlett Packard or HP), Blackberry® (RIM) smart phones, Apple® iPhone®, Motorola Droid®, HTC, Samsung, LG, and the like. Tablet devices include the iPad® tablet computer by Apple® and more generally a class of lightweight portable computers known as Netbook® computers. In some embodiments, the mobile device 200 may be comprise, or be implemented as, any type of wireless device, mobile station, or portable computing device with a self-contained power source (e.g., battery) such as a laptop computer, ultra-laptop computer, personal digital assistant (PDA) with communications capabilities, cellular telephone, combination cellular telephone/PDA, mobile unit, subscriber station, user terminal, portable computer, handheld computer, palmtop computer, wearable computer, media player, pager, messaging device, data communication device, and so forth.

In one embodiment, the mobile device detector module 710 is configured to detect presence of the mobile device 712 located within a detection zone 104 defined as a three-dimensional zone within or in proximity of the driver seat 106. Methods of detecting the presence of the mobile device 712 may vary based on the wireless technology communication standards used by the mobile device 712. Examples of wireless technology communication standards that may be used In the United States, for example, may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, 3G systems such as Wide-band CDMA (WCDMA), 4G systems, CDMA-2000, Universal Mobile Telephone System (UMTS) systems, Integrated Digital Enhanced Network (iDEN) (a TDMA/GSM variant) and so forth. These wireless communications standards are fully familiar to those of ordinary skill in the art. The frequency and signal strength of the radio frequency (RF) signals transmitted by the mobile device 712 depend on the network type and communication standard. The mobile device detector module 710 detects the RF signal, or simply electromagnetic energy radiation, transmitted by the mobile device 712, generally speaking. Accordingly, in one embodiment, the mobile device detector module 710 may be configured to lock onto specific cellular frequencies or cellular frequency bands or may be configured to scan all the available cellular frequencies or cellular frequency bands and lock onto the RF signal emitted by the mobile device 712.

In one embodiment, the mobile device detector module 710 may comprise a wireless sensor 718 coupled to the multiband antenna 714. The wireless sensor 718 may be tuned to detect energy at a predetermined signal strength in the electromagnetic signal 720, e.g., RF signal, emitted by the mobile device 712 and received by the antenna 714. It will be appreciated that the signal strength or power of the energy radiated by the electromagnetic signal 720 emitted by the mobile device 712 will be greatest when the mobile device 712 is making an outbound call or otherwise communicating with a cellular base station (e.g., searching for base station signals or in contact with a base station or cell). Very little energy in the electromagnetic signal 720 is radiated when the mobile device 712 is turned off or when it is not communicating with the cellular base station. In the latter case, when the mobile device 712 is turned on but is not communicating with the cellular base station, the mobile device 712 possibly may be detected only when the mobile device detector module 710 comprises extremely sensitive components. Most conventional mobile devices 712 radiate energy at a power level ranging from about 0.5 milliwatts (mW) to about several hundred mW. A mobile device detector module 710 of suitable sensitivity can be configured to detect electromagnetic signals 720 in this range of power level. Many radio electronic equipment are capable of detecting low-level power in the electromagnetic signal 720 and is one reason why airlines are very sensitive about electronic equipment that operates at key points of the flight, why some electronic equipment should be turned off near blast sites, and why cellular phones should be turned off around some types of hospital equipment.

It is well known that a mobile device 720, such as, for example, a cellular telephone using the GSM standard, generates detectable radio interference. It is well known to users of GSM cellular telephones that when the cellular telephone is used in the vicinity of an electronic device (such as, for example, a radio receiver, stereo system, TV set, a wired/fixed telephone or even another GSM cell phone), the radio transmissions from the GSM cell phone may be inadvertently "picked up" by the electronic device and a signal proportional to the envelope of the radio transmission may be produced inside the electronic device. In fact, this typically unwanted signal may even disrupt the operation of the electronic device. For example, it is particularly well known that GSM cellular telephones present a potential hazard for wearers of heart pacemakers, as the GSM signal may disrupt proper pacemaker operation when the phone is very near to the wearer's chest.

In one embodiment, the wireless sensor 718 is configured to exploit the detectable radio interference of the electromagnetic signal 720 generated by the mobile device 712 when it is communicating with the cellular base station. When the wireless sensor 718 of the mobile device detector module 710 detects the electromagnetic signal 720, it assumes the presence of a mobile device 712 located within the detection zone 104, i.e., in or in proximity of the driver seat 106, and communicates a signal 722 to the control module 708.

In one embodiment, the wireless sensor 718 may comprise an energy harvester to harvest the energy in the electromagnetic signal 720 transmitted by the mobile device 712. The energy harvester receives the radiated energy at the antenna 714 and converts the energy into a voltage potential to energize the detector module 704 and communicate the signal 722 to the control module 708. In other embodiments, the energy harvester may be separate from the wireless sensor 718 and the voltage potential produced by the energy harvester may be used to energize the wireless sensor 718. In any embodiment, the voltage potential produced by the energy harvester is employed to determine the presence of a mobile device 712 in the detection zone 104. Accordingly, the sensitivity of the wireless sensor 718 is adjusted such that the energy harvester is sensitive only to the radiated energy levels that typically occur when the mobile device 712 is located within the detection zone 104 and not sensitive to electromagnetic energy transmitted by mobile devices located outside the detection zone 104. In this manner, intoxicated passengers can freely use their mobile devices outside the detection zone 104 without triggering the mobile device detector module 710.

In other embodiments, the mobile device detector module 710 may be coupled to the electrical system of the vehicle 100 and powered by the vehicle battery, or may be powered by a separate battery. In such embodiments, the mobile device detector module 710 comprises a frequency scanning and power level measurement module that measures the power of the electromagnetic signal 720 transmitted by the mobile device 712. Accordingly, the sensitivity of the mobile device detector module 710 can be tuned to trigger the detection signal 722 when the mobile device detector module 710 detects transmit power levels that correspond to the mobile device 712 being located in the detection zone 104 without triggering the detection signal 722 for transmit power levels corresponding to the mobile devices located outside the detection zone 104. This may be accomplished by strategically locating a directional multi-band antenna 714 such that it is maximally sensitive to transmit power level radiated by the mobile device 712 located in the detection zone 104 and minimally sensitive to transmit power levels to the mobile devices located outside the detection zone 104.

Figure 8:
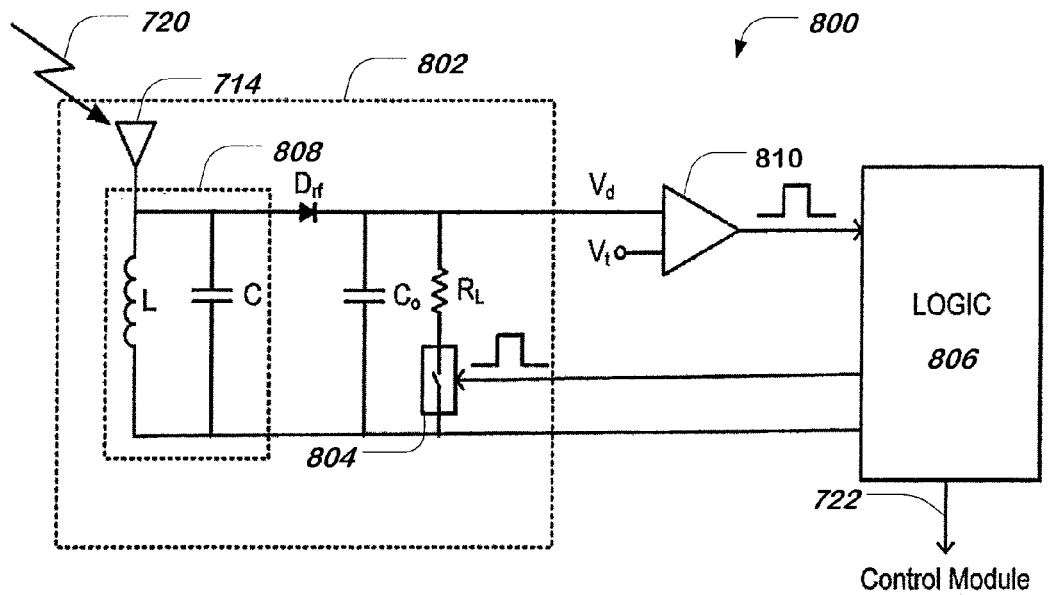
FIG. 8 illustrates one embodiment of a mobile device detection module for detecting the presence of a mobile device in a predetermined vehicle zone.

FIG. 8 illustrates one embodiment of a power sensor circuit 800 for detecting the energy radiated by the electromagnetic signal 720 transmitted by the mobile device 712. The illustrated power sensor circuit 800 is one embodiment of a wireless sensor 718 described in connection with FIG. 7B. The power sensor circuit 800 also converts the energy in the radiated electromagnetic signal 720 to a voltage potential indicative of the location of the mobile device 712. In the illustrated embodiment, the power sensor circuit 800 is not connected to the power source of the vehicle 100 or to a separate battery. Rather, the power sensor circuit 800 is one implementation of an energy harvester circuit which derives its power only from the energy radiated by the electromagnetic signal 720 transmitted by the mobile device 712. The electromagnetic signal 720 detected by the antenna 714 is filtered by tuning circuit 808 to match the most common frequency bands used by mobile devices. In one embodiment, the tuning circuit 808 may comprise an inductor L and a capacitor C selected to tune the power sensor circuit 800 to the desired frequency band. Those skilled in the art will appreciate that the tuning circuit may be implemented using digital or analog tuning techniques and therefore the embodiment disclosed in FIG. 8 is not limiting.

The diode $D_{rf}$ is an RF diode and acts to partially rectify the electromagnetic signal 720 received by the antenna 714 and tuned by the L-C circuit. The output of the RF diode charges a capacitor $C_o$ to a predetermined potential $V_d$. Thus, the power sensor circuit 800 converts the radiated electromagnetic signal 720 to a voltage potential $V_d$ that corresponds to the location of the mobile device 712 within the vehicle 100. With reference now to FIGS. 7A-8, when the voltage potential $V_d$ across the output capacitor $C_o$ exceeds a predetermined level, it indicates the presence of a mobile device 712 within the detection zone 104. The voltage potential $V_d$ is compared to a threshold voltage $V_t$ by a comparator 810. The threshold voltage $V_t$ is predetermined as the voltage level corresponding to the mobile device 712 being located in the detection zone 104. The output of the comparator 810 is provided to a detection logic module 806, which may be part of the mobile device detector module 710. The detection logic module 806 then generates a detection signal 722 and communicates the detection signal 722 to the control module 708. Upon receiving the detection signal 722, the control module 708 can use the detection signal 722 in conjunction with the alcohol detection signal 724 generated by the mobile alcohol detection module 704 to identify an intoxicated driver and to control operation of the vehicle.

In the embodiment illustrated in FIG. 8, the tuning circuit 808 may be implemented to have a bandwidth encompassing the most popular cellular telephone frequencies. Since the tuning circuit 808 is fixed, it is tuned to a wide frequency band to receive electromagnetic signals 720 from about 0.8 to about 2 GHz, as shown in TABLE 1 below. In other embodiments, however, as described in connection with FIG. 9, the tuning circuit 808 may include a frequency band scanner to switch between multiple tuning elements and scan the detection zone 104 for multiple frequencies to more precisely tune the power sensor circuit 800 to the appropriate frequency band of the mobile device 712 located in the detection zone 104.

Figure 9:
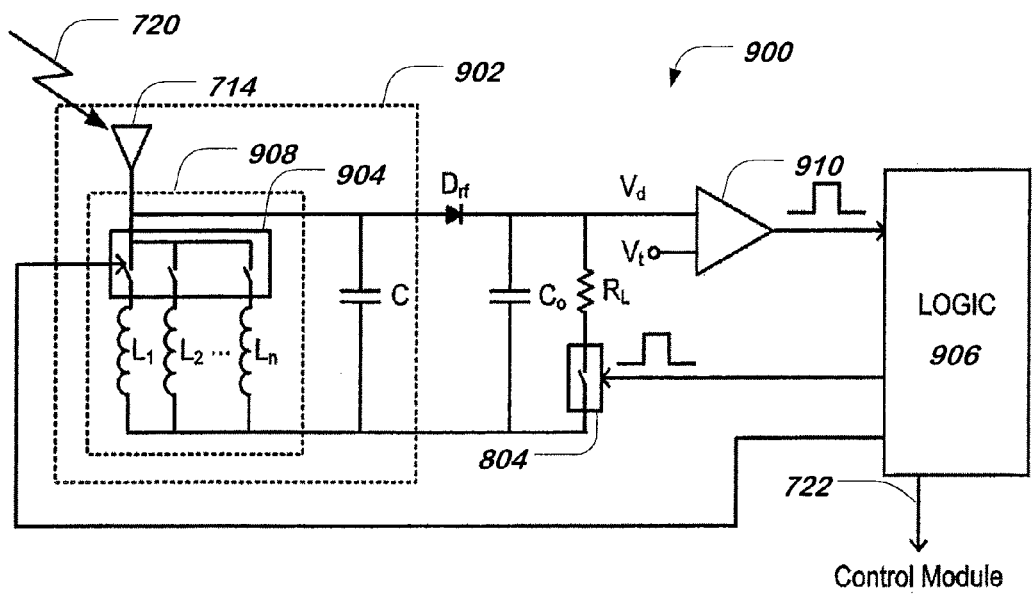
FIG. 9 illustrates another embodiment of a mobile device detection module which implements a variable tuning circuit.

FIG. 9 illustrates one embodiment of a power sensor circuit 900 comprising a tuning circuit 908 with a scanner 904 in series with the antenna 714. The scanner 904 is controlled by the logic module 906 and sweeps multiple frequency bands. With reference now to FIGS. 7A-9, the logic module 906 periodically switches tuning elements $L_1$, $L_2$, $L_n$, into the tuning circuit 908 to monitor various frequency bands associated with the mobile device 712 located in the detection zone 104. The voltage potential $V_d$ is compared to a threshold voltage $V_t$ by a comparator 910. The threshold voltage $V_t$ is predetermined as the voltage level corresponding to the mobile device 712 being located in the detection zone 104. In other respects, the power sensor circuit 900 shown in FIG. 9 operates in a manner similar to the power sensor circuit 800 shown in FIG. 8.

Figure 10:
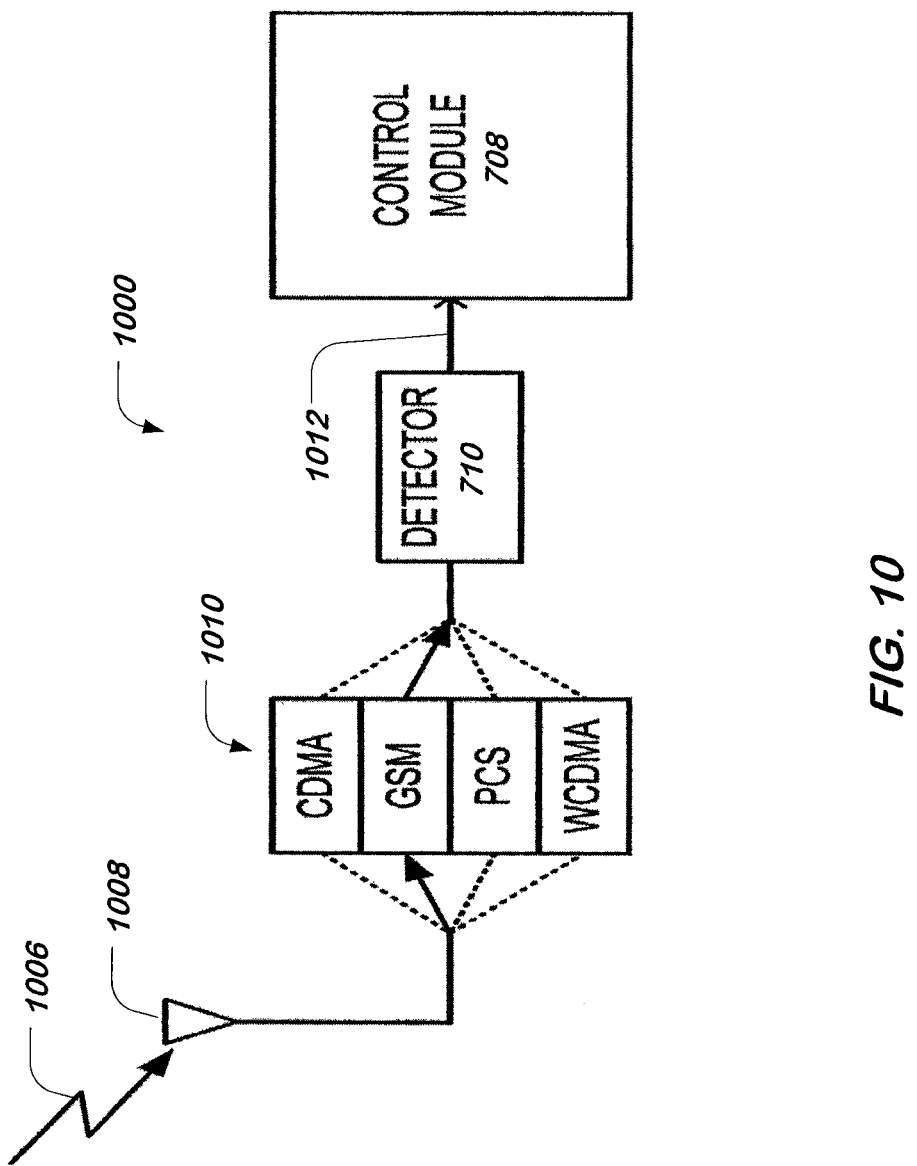
FIG. 10 illustrates one embodiment of a mobile device detection module which implements a scanning circuit.

FIG. 10 illustrates a schematic diagram of a multi-band detector 1000 for monitoring uplink activity of the mobile device 712. In the illustrated embodiment, the multi-band detector 1000 provides high-speed scanning of cell phone uplink frequency bands for CDMA, GSM, PCS, and WCDMA. An uni-directional multi-band antenna 1008 receives signals 1006 from a mobile device 712 located in the detection zone 104. A scanner 1010 continuously scans CDMA, GSM, PCS, and WCDMA frequency bands for mobile devices 712 located in the detection zone 104 that are in active or idle state. A detector module 710 provides a detection signal 1012 to the control module 708 for detecting the presence of an intoxicated driver, as previously discussed. The up-link frequencies covered by the multi-band detector 1000 shown in FIG. 10 are listed in TABLE 1 below.

TABLE 1

| Air Interface | Frequency Band (MHz) |
|---|---|
| North America | |
| GSM-850, GSM-900, CDMA, Cellular | 824-849 |
|  | 890-915 |
| GSM-1900/PCS-1900 | 1850-1910 |
| European Union/Asia/Australia | |
| E-GSM-900 | 880-915 |
| GSM 1800 (DCS-1800) | 1710.2-184.8 |
| WCDMA/UMTS | 1920-1980 |

The multi-band detector 1000 may be implemented using a variety of components to detect radiated energy in the signal 1006 received by the uni-directional multi-band antenna 1008 and make RF power measurements at low levels by the detector module 710 in order to detect the presence of a mobile device 712 in the detection zone 104. The RF power level may be measured directly or may be sampled. Recently, a number of integrated RF power detectors have become available, intended for wireless networking and mobile telephone applications. Since these integrated circuits are produced in high-volume using integrated-circuit technology, they are consistent and inexpensive—often cheaper than typical microwave diodes, such as RF diode $D_{rf}$ shown in FIGS. 8 and 9. Many of them are specified for operation into the GHz region, covering several amateur microwave bands, and a few operate to 10 GHz and beyond.

In one embodiment, the RF power detector module 1002 may be implemented with an LTC5508 integrated circuit from Linear Technologies rated up to 7 GHz, which is well within the bandwidth required for mobile devices frequency bands shown in TABLE 1. This integrated circuit requires operate a few milliamps at 3 to 5 volts and would be connected to the power supply of the vehicle or to a separate battery. An LT5534 logarithmic-amplifier type detector rated up to 3 GHz with 60 dB of dynamic range may be employed to amplify the RF power signal detected by the LTC5508 integrated circuit.

The multi-band detector 1000 may be employed to measure RF power transmitted by the mobile device 712 and also antenna radiation pattern measurement. The sensitivity of the multi-band detector 1000 may be useful for low-level power measurements as an "RE Sniffer" to detect RF leakage from the mobile device 712. The multi-band detector 1000 provides fast response so that it may be used to detect modulation and to detect noise levels from the multi-band antenna 1006.

The various illustrative functional elements, logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format.

The functions of the various functional elements, logical blocks, modules, and circuits elements described in connection with the embodiments disclosed herein may be performed through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, DSP hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

The various functional elements, logical blocks, modules, and circuits elements described in connection with the embodiments disclosed herein may comprise a processing unit for executing software program instructions to provide computing and processing operations for the alcohol detection and vehicle control system 102. Although the processing unit may include a single processor architecture, it may be appreciated that any suitable processor architecture and/or any suitable number of processors in accordance with the described embodiments. In one embodiment, the processing unit may be implemented using a single integrated processor.

Figure 11:
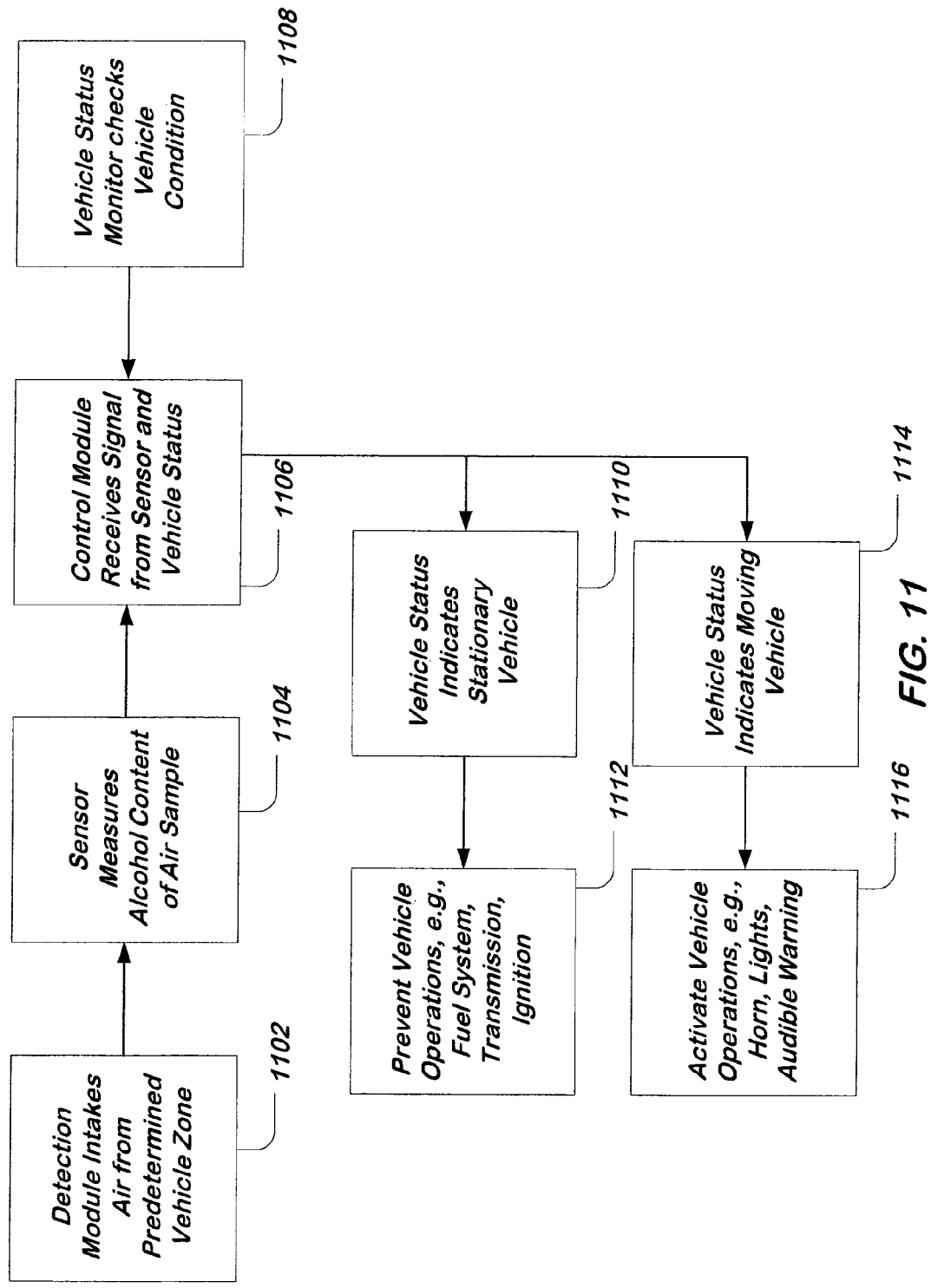
FIG. 11 illustrates one embodiment of a logic diagram for determining the BAC of a driver based on sampling the air in a predetermined vehicle zone.

FIG. 11 illustrates one embodiment of one aspect of a method for preventing or controlling operation of a vehicle by an intoxicated driver. An air sample is obtained 1102 from a detection zone. The air sample is then tested 1104 for the presence of alcohol. When the air sample has an alcohol content above a predetermined value a signal is generated and transmitted 1106. A signal representing the current status of the vehicle is also generated 1108 and transmitted 1106. The vehicle status signal is checked 1110, 1114 and when the vehicle is stationary, a critical vehicle system is disabled 1112 to prevent operation of the vehicle. When the vehicle is in motion, a vehicle operation is activated to indicate the presence of an intoxicated operator.

Figure 12:
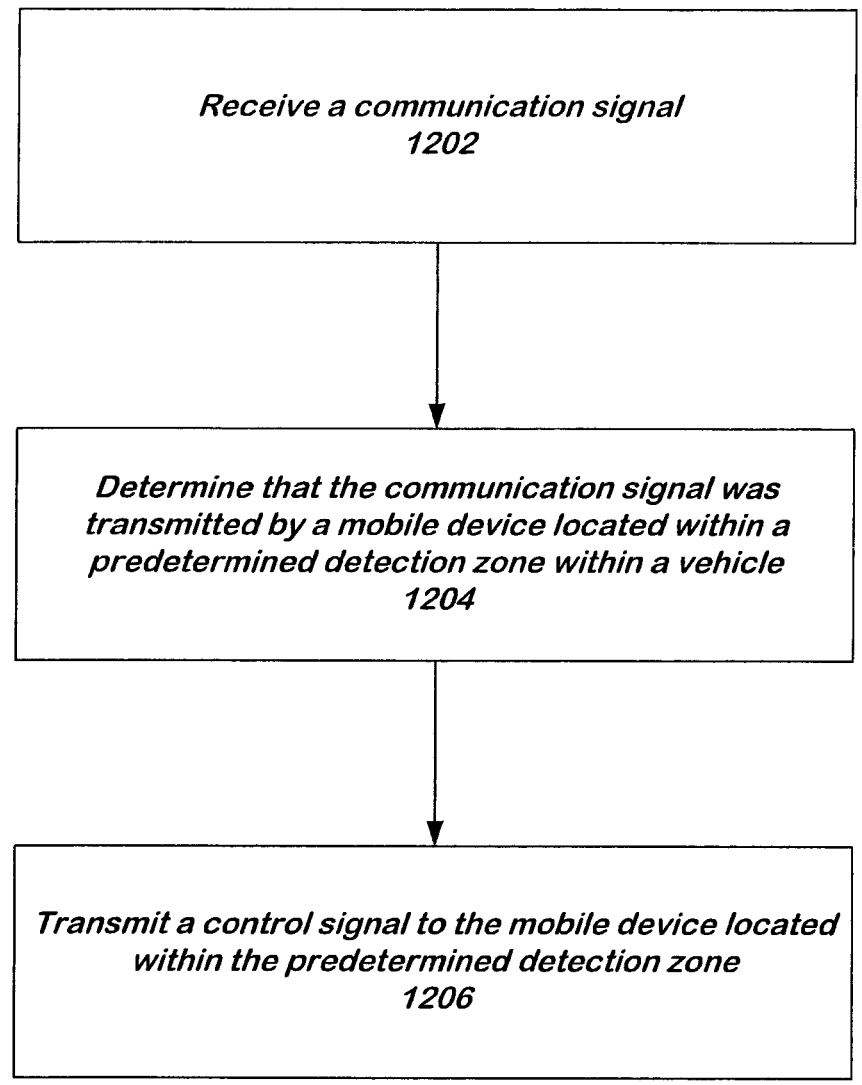
FIG. 12 illustrates one embodiment of a logic diagram for determining the presence of a mobile device located in a predetermined detection zone within a vehicle.

FIG. 12 illustrates one embodiment of a logic diagram 1200 for determining the presence of a mobile device located in a predetermined detection zone within a vehicle. With reference now to FIGS. 7A-12, in one embodiment, the detection module 710 receives 1202 a communication signal 720. The detection module 710 determines 1204 that the communication signal 720 was transmitted by a mobile device 712 located within a predetermined detection zone 104 within a vehicle 100. The control module 710 transmits 1206 a control signal to the mobile device 712 located within the predetermined detection zone 104.

In one embodiment, the detection module 710 transmits a detection signal 722 to the control module 708 when a voltage potential $V_d$ substantially equals a predetermined threshold value $V_t$, wherein the voltage potential of the predetermined threshold value $V_t$ indicates the presence of the mobile device 712 within the predetermined detection zone 104.

In one embodiment, the detection module 710 scans for a plurality frequency bands associated with the mobile device 712. The radiated power level of the communication signal 720 in the plurality of frequency bands received by the detection module 710 are monitored by the detection module 710. The detection module 710 transmits a detection signal 722 to the control module 708 when the measured radiated power level substantially equals at least predetermined value $V_t$.

In one embodiment, the detection module 710 harvests the energy in the received communication signal 720 and generates a voltage potential corresponding to the location of the mobile device 104 within the detection zone 104.

In one embodiment, the control module 708 monitors a functional system of the vehicle 100. The transmission of the control signal is activated when the monitored functional system is activated and the detection module 710 determines that the communication signal was transmitted by the mobile device 712 located within the predetermined detection zone 104. In one embodiment, the functional system of the vehicle 100 is any one of an ignition system, a transmission system, and a sensor.

In one embodiment, when the control module 708 receives the detection signal 722, the control module 708 either jams the mobile device 104, jams at least one function of the mobile device 104, or redirects the operation of the mobile device 104 to a hands-free alternate system.

In various embodiments, the mobile device 104 may be configured to provide voice and/or data communications functionality in accordance with different types of wireless network systems or protocols. Examples of suitable wireless network systems offering data communication services may include the Institute of Electrical and Electronics Engineers (IEEE) 802.xx series of protocols, such as the IEEE 802.1a/b/g/n series of standard protocols and variants (also referred to as "WiFi"), the IEEE 802.16 series of standard protocols and variants (also referred to as "WiMAX"), the IEEE 802.20 series of standard protocols and variants, and so forth. Additionally, the mobile device 200 may utilize different types of shorter range wireless systems, such as a Bluetooth system operating in accordance with the Bluetooth Special Interest Group (SIG) series of protocols, including Bluetooth Specification versions v1.0, v1.1, v1.2, v1.0, v2.0 with Enhanced Data Rate (EDR), as well as one or more Bluetooth Profiles, and so forth. Other examples may include systems using infrared techniques or near-field communication techniques and protocols, such as electromagnetic induction (EMI) techniques. An example of EMI techniques may include passive or active radio-frequency identification (RFID) protocols and devices.

Figure 13:
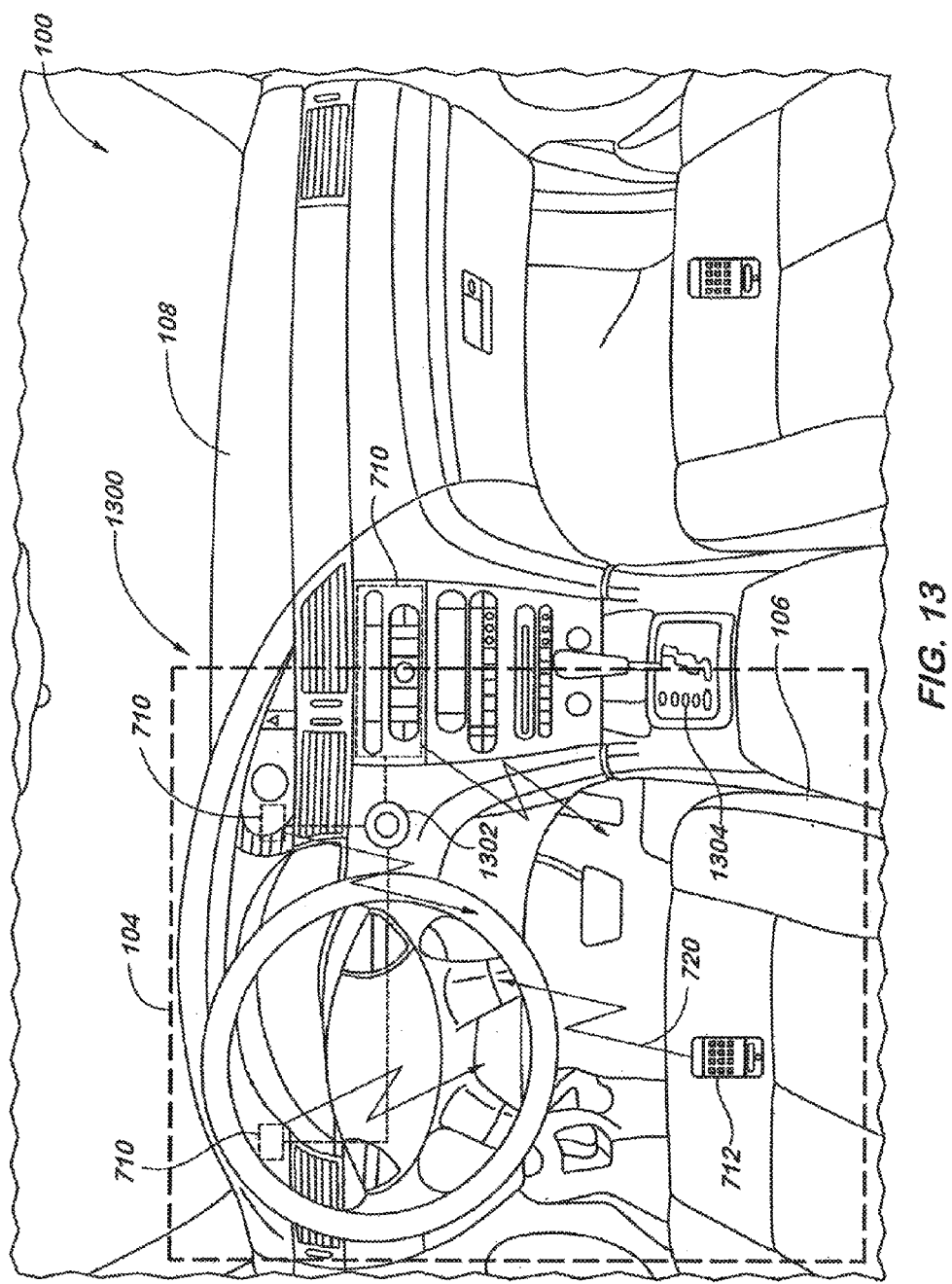
FIG. 13 illustrates an interior portion of a vehicle comprising one embodiment of a alcohol detection and vehicle control system located within a dashboard of the vehicle.

FIG. 13 illustrates an interior portion of the vehicle 100 comprising one embodiment of the alcohol detection and vehicle control system 102 located within the dashboard 108 of the vehicle 100. FIG. 13 illustrates three potential locations within the dashboard 108 where the mobile device detection module 710 can be located. It will be appreciated that the mobile device detection module 710 may be located in one or more of these locations on or within the dashboard 108. It would be preferable that the mobile device detection module 710 be located within the dashboard 108 to prevent user tampering. Accordingly, the mobile device detection module 710 is shown in phantom to indicate that the detection and control system 102 is located within the dashboard 108. In another embodiment, the control module 708 may be configured with a data collection process to record a situation when the mobile device detection module 710 was deactivated by an owner of the vehicle 100 with or without the help of a car mechanic.

With reference now to FIGS. 7A-13, the alcohol detection and vehicle control system 102 comprises a mobile device detector module 710 and a control module 708 coupled to the mobile device detector module 710. The mobile device detector module 710 detects the presence of a mobile device 712 within the detection zone 114 ("Discovery Umbrella"). When the mobile device detector module 710 detects the presence of a mobile device 712 within the detection zone 104, the control module 708 activates the jamming module which transmits the control signal. The control signal interferes with the operation of the mobile device 712 when it is located within the detection zone 104 without interfering with mobile devices located outside the detection zone 114.

In one embodiment, the alcohol detection and vehicle control system 102 may be triggered when the driver enters the vehicle 100. Upon being triggered, the alcohol detection and vehicle control system 102 is initialized and goes into detection mode to establish a no-communication system ("NoCom system"). The detection mode is a process wherein the alcohol detection and vehicle control system 102, through one or more sensor(s) and logic detects the presence of all electromagnetic signals 720 such as RF, Wi-Fi, Cellular, and Satellite communications signals from the mobile device 712. In one embodiment, the detection process is initiated by the alcohol detection and vehicle control system 102, which is not dependent upon a driver's interaction to initiate the detection process. Decoupling the process from the driver, young and old, is advantageous because it avoids reliance on self policing, which currently has failed to work even with laws presently enacted. Thus, the triggering condition may be the activation of a switch such as the ignition switch 1302 of the vehicle 100 or deactivation of a "park" sensor 1304 of an automatic transmission of the vehicle 100, among other sensors.

Accordingly, upon ignition of the vehicle 100, the alcohol detection and vehicle control system 102 would initiate the detection process via logic that controls the operation of the mobile device detection module 710 and the control module 708. In accordance with the detection process, logic would instruct the sensor module 718 to initiate sensing or scanning for any type of communication signals 722 emitted by the mobile device 712 within the detection 104 within the driver side 106 area of the vehicle 100. In one embodiment, the sensor module 718 may be located within the dashboard 108 console and or within a microphone of a hands-free set. This configuration would hide the sensor module 718 and prevent drivers from tampering with the alcohol detection and vehicle control system 102 by blocking the sensor module 718 or prevent activation of the detection process. In one embodiment, the sensor module 718 may be coupled to the ignition 1302 to render the vehicle 100 inoperable when the sensor module 718 is blocked.

The logic provides a detection process for detecting communication signals 720 emitted by the mobile device 712 located within the detection zone 104 to prevent the driver from adequately using the mobile device 712. The detection process will detect and take control of the driver side mobile device 712. The logic, however, will not prevent passengers from using their mobile devices outside the detection zone 104.

Once the detection process is initiated, when the mobile device 712 is a smart phone and is detected within the detection zone 104, in one embodiment, the alcohol detection and vehicle control system 102 can automatically connect to the vehicle 100 hands-free communication system. When no hands-free communication system is available, the mobile device 712 would be disabled by the control signals transmitted by the jamming module. Nevertheless, the alcohol detection and vehicle control system 102 would always allow emergency 911 calls.

Additionally, once the detection process is initiated, when the mobile device 712 is a smart phone and is detected within the detection zone 114, in one embodiment, the alcohol detection and vehicle control system 102 is configured to disable inbound/outbound text messaging features of the mobile device 712. In one embodiment, all inbound text messages would be saved as is the case currently. In one embodiment, the alcohol detection and vehicle control system 102 is configured through logic to read back the text via the Bluetooth/hands-free system as well as reply via voice activated text via the Bluetooth/hands-free communication system. In such an embodiment, the jamming module may communicate with the mobile device 712 through a secondary channel, such as a Bluetooth wireless connection or any other connection that is secondary to the primary cellular communication channel. In some embodiments, the jamming module may communicate only on the primary communication channel of the mobile device 712 or in addition to one or more secondary cellular communication channels.

Moreover, once the detection process is initiated, when the mobile device 712 is a smart phone and is detected within the detection zone 104, in one embodiment, the alcohol detection and vehicle control system 102 is configured to disable inbound/outbound emailing features. In one embodiment, all inbound emails would be saved as is the case currently. The alcohol detection and vehicle control system 102 is configured through the logic module to read back the email via the Bluetooth/hands-free system as well as reply via voice activated email via the Bluetooth/hands-free communication system.

Furthermore, once the detection process is initiated, when the mobile device 712 is an iPad® or a Netbook® device and is detected within the detection zone 104, in one embodiment, the alcohol detection and vehicle control system 102 is configured to disable inbound/outbound text messaging/emailing features. All inbound emails would be saved as is the case currently. The alcohol detection and vehicle control system 102 is configured through the logic module to read back the email/text via the Bluetooth/hands-free system as well as reply via voice activated email/text via the Bluetooth/hands-free communication system.

The functions of the various functional elements, logical blocks, modules, and circuits elements described in connection with the embodiments disclosed herein may be implemented in the general context of computer executable instructions, such as software, control modules, logic, and/or logic modules executed by the processing unit. Generally, software, control modules, logic, and/or logic modules include any software element arranged to perform particular operations. Software, control modules, logic, and/or logic modules can include routines, programs, objects, components, data structures and the like that perform particular tasks or implement particular abstract data types. An implementation of the software, control modules, logic, and/or logic modules and techniques may be stored on and/or transmitted across some form of computer-readable media. In this regard, computer-readable media can be any available medium or media useable to store information and accessible by a computing device. Some embodiments also may be practiced in distributed computing environments where operations are performed by one or more remote processing devices that are linked through a communications network. In a distributed computing environment, software, control modules, logic, and/or logic modules may be located in both local and remote computer storage media including memory storage devices.

Additionally, it is to be appreciated that the embodiments described herein illustrate example implementations, and that the functional elements, logical blocks, modules, and circuits elements may be implemented in various other ways which are consistent with the described embodiments. Furthermore, the operations performed by such functional elements, logical blocks, modules, and circuits elements may be combined and/or separated for a given implementation and may be performed by a greater number or fewer number of components or modules. As will be apparent to those of skill in the art upon reading the present disclosure, each of the individual embodiments described and illustrated herein has discrete components and features which may be readily separated from or combined with the features of any of the other several aspects without departing from the scope of the present disclosure. Any recited method can be carried out in the order of events recited or in any other order which is logically possible.

It is worthy to note that any reference to "one embodiment" or "an embodiment" means that a particular feature, structure, or characteristic described in connection with the embodiment is included in at least one embodiment. The appearances of the phrase "in one embodiment" or "in one aspect" in the specification are not necessarily all referring to the same embodiment.

Unless specifically stated otherwise, it may be appreciated that terms such as "processing," "computing," "calculating," "determining," or the like, refer to the action and/or processes of a computer or computing system, or similar electronic computing device, such as a general purpose processor, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, application program interface (API), exchanging messages, and so forth.

It will be appreciated that those skilled in the art will be able to devise various arrangements which, although not explicitly described or shown herein, embody the principles of the present disclosure and are included within the scope thereof. Furthermore, all examples and conditional language recited herein are principally intended to aid the reader in understanding the principles described in the present disclosure and the concepts contributed to furthering the art, and are to be construed as being without limitation to such specifically recited examples and conditions. Moreover, all statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present disclosure, therefore, is not intended to be limited to the exemplary aspects and aspects shown and described herein. Rather, the scope of present disclosure is embodied by the appended claims.

The terms "a" and "an" and "the" and similar referents used in the context of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as", "in the case", "by way of example") provided herein is intended merely to better illuminate the invention and does not pose a limitation on the scope of the invention otherwise claimed. No language in the specification should be construed as indicating any non-claimed element essential to the practice of the invention. It is further noted that the claims may be drafted to exclude any optional element. As such, this statement is intended to serve as antecedent basis for use of such exclusive terminology as solely, only and the like in connection with the recitation of claim elements, or use of a negative limitation.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability.

While certain features of the embodiments have been illustrated as described above, many modifications, substitutions, changes and equivalents will now occur to those skilled in the art. It is therefore to be understood that the appended claims are intended to cover all such modifications and changes as fall within the scope of the disclosed embodiments.

What is claimed is:

1. An apparatus, comprising:
   an air intake configured to collect an air sample from a predetermined detection zone, wherein the predetermined detection zone is defined as a. three-dimensional zone substantially in or in proximity of an area of a vehicle occupied by a driver during operation of the vehicle;
   an occupant detection sensor configured to detect the presence of the driver within the predetermined detection zone, wherein the occupant detection sensor automatically operates the air intake to sample the predetermined detection zone when the driver is detected;
   a detector module comprising an alcohol sensor configured to produce an electrical signal representative of a blood alcohol content of the driver, wherein the electrical signal is generated by measuring an alcohol content of the air sample; and
   a control module electrically coupled to the detector module, the control module configured to control at least one operation of the vehicle in response to the electrical signal received by the control module from the alcohol sensor.

2. The apparatus of claim 1, wherein the occupant detection sensor comprises a pressure sensor located within the detection zone.

3. The apparatus of claim 1, wherein the occupant detection sensor comprises an ignition key sensor configured to detect insertion of a key into an ignition of the vehicle.

4. The apparatus of claim 1, wherein the occupant detection sensor comprises a mobile device detection sensor configured to detect the presence of a mobile device within the predetermined detection zone, and
wherein the presence of the mobile device within the predetermined detection zone is indicative of the presence of the driver.

5. The apparatus of claim 1, wherein the control module is configured to delay operation of the vehicle to allow adequate sampling of the detection zone by the detector module, and
wherein the control module enables operation of the vehicle if the detection module indicates the alcohol content of the air sample is below a predetermined threshold after a predetermined period.

6. The apparatus of claim 1, wherein the air intake is located within a dashboard of the vehicle to prevent tampering with or disabling of the air intake.

7. The apparatus of claim 6, wherein the control module comprises an anti-tamper data control process configured to detect and record if any of the air intake, the detector module, the control module, the operator detection sensor, or any combination thereof, is disabled.

8. The apparatus of claim 6, wherein the control module is configured to prevent operation of the vehicle if the air intake is blocked.

9. The apparatus of claim 1, comprising a vehicle status detector module configured to generate a status signal representative of a vehicle operation condition.

10. The apparatus of claim 9, wherein when the status signal indicates the vehicle is stationary, the control module prevents operation of at least one of an ignition system, a fuel system, a transmission system, or any combination thereof.

11. The apparatus of claim 9, wherein when the status signal indicates the vehicle is moving, the control module activates at least one of a horn, hazard lights, an audible warning, or any combination thereof.

12. An apparatus, comprising:
a detection module configured to detect a mobile device located within a predetermined detection zone within a vehicle, wherein the predetermined detection zone is defined as a three-dimensional zone substantially in or in proximity of an area of a vehicle occupied by a driver during operation of the vehicle;
a control module in signal communication with the detection module, the control module responsive to a wireless signal from the mobile device,
wherein the wireless signal is representative of a blood alcohol content of a user of the mobile device as determined by an alcohol sensor located within the mobile device,
wherein the control module is configured to control one or more vehicle operations, and
wherein the control module is activated by the detection module when the detection module detects the mobile device within the predetermined detection zone.

13. The apparatus of claim 12, wherein the detection module comprises:
a receiver configured to receive a communication signal, wherein the detection module is configured to determine when the communications signal was transmitted by the mobile device located within the predetermined detection zone; and
a transmitter configured to transmit a detection signal to the control module when the detection module determines that the communications signal was transmitted by the mobile device located within the predetermined detection zone.

14. The apparatus of claim 13, wherein the detection module comprises a scanner configured to scan for a plurality of frequency bands associated with the mobile device,
wherein the detection module is configured to monitor a radiated power level of the signal detected by the scanner in each of the plurality of frequency bands, and
wherein the transmitter is configured to transmit the detection signal when the measured radiated power level substantially equals at least a predetermined value.

15. The apparatus of claim 13, wherein the detection signal is transmitted by the detection module when a voltage potential of the communications signal equals a predetermined value, and
wherein the voltage potential of the predetermined value indicates the presence of the mobile device within the predetermined detection zone.

16. The apparatus of claim 12, comprising a vehicle status detector module configured to generate a status signal representative of a vehicle operation condition.

17. The apparatus of claim 16, wherein when the status signal is representative of a stationary vehicle, the control module prevents the operation of at least one of an ignition system, a fuel system, a transmission system, or any combination thereof.

18. The apparatus of claim 16, wherein when the status signal is representative of a moving vehicle, the control module activates at least one of a horn, a vehicle light, an audible warning, or any combination thereof.

19. The apparatus of claim 12, wherein the control module is configured to disable operation of the vehicle until the control module receives the wireless signal from the mobile device indicating a blood alcohol level below a predetermined threshold.

20. A method for controlling operation of a vehicle, the method comprising:
detecting, by an operator detection sensor, a driver of a vehicle within a predetermined detection zone, wherein the predetermined detection zone is defined as a three-dimensional zonal substantially in or in proximity of an area of a vehicle occupied by the driver during operation of the vehicle;
collecting, by an air intake, an air sample from the predetermined detection zone, wherein the air intake is activated by the operator detection sensor when the driver is detected within the predetermined detection zone;
measuring, by an alcohol sensor, an alcohol content of the air sample, wherein the alcohol content of the air sample corresponds to a blood alcohol content of the driver; and
controlling, by a control module, at least one vehicle operation when the measured alcohol content of the air sample exceeds a predetermined threshold.

* * * * *